United States Patent [19]
Hosoe et al.

[11] Patent Number: 6,081,052
[45] Date of Patent: Jun. 27, 2000

[54] ROTOR FOR ROTATING MACHINE, PROCESS FOR PRODUCING THE SAME, AND MAGNET UNIT

[75] Inventors: Mitsuya Hosoe; Naomasa Kimura; Katsutoshi Nosaki; Kazuo Otsuka; Takayuki Sato; Masato Kita; Kenichiro Shiokawa, all of Saitama-ken, Japan

[73] Assignee: Honda Giken Kogyo Kabushiki Kaisha, Tokyo, Japan

[21] Appl. No.: 08/835,672

[22] Filed: Apr. 10, 1997

Related U.S. Application Data

[63] Continuation of application No. PCT/JP95/02102, Oct. 13, 1995, abandoned.

[30] Foreign Application Priority Data

| Oct. 14, 1994 | [JP] | Japan | 6-249802 |
| Apr. 12, 1995 | [JP] | Japan | 7-086594 |
| Jun. 20, 1995 | [JP] | Japan | 7-153562 |

[51] Int. Cl.[7] .......................... H02K 15/03; H02K 21/14
[52] U.S. Cl. ........................................ 310/42; 310/156
[58] Field of Search ............................ 310/154, 254, 310/42, 156; 29/598

[56] References Cited

U.S. PATENT DOCUMENTS

| 4,472,651 | 9/1984 | Jones | 310/156 |
| 5,193,266 | 3/1993 | Caputo | 29/598 |
| 5,323,077 | 6/1994 | Brandes | 310/156 |
| 5,397,951 | 3/1995 | Uchida et al. | 310/156 |
| 5,548,172 | 8/1996 | Kliman et al. | 310/156 |
| 5,670,836 | 9/1997 | Horst | 310/156 |

FOREIGN PATENT DOCUMENTS

| 4-101640 | 4/1992 | Japan . |
| WO 91/10277 | of 1991 | WIPO . |

OTHER PUBLICATIONS

European Search Report.

*Primary Examiner*—Clayton LaBalle
*Attorney, Agent, or Firm*—Lyon & Lyon LLP

[57] ABSTRACT

In producing a rotor for a rotating machine by bonding a rotor body and a plurality of permanent magnets to each other through a heating step and a subsequent cooling step, a rotor body having a larger coefficicient of linear thermal expansion at the cooling step has its joint surface formed by assembling of a plurality of small joint faces. Thus, it is possible to moderate a thermal stress in a brazing filler metal layer between the rotor body and each of the permanent magnets to avoid the generation of cracks in the permanent magnets having a smaller coefficient of linear thermal expansion at the cooling step and to firmly bond the rotor body and each of the permanent magnets to each other.

26 Claims, 22 Drawing Sheets

Before heating

During heating

After cooling

Before heating

During heating

After cooling

Before heating

During heating

After cooling

ROTOR FOR ROTATING MACHINE, PROCESS FOR PRODUCING THE SAME, AND MAGNET UNIT

PRIORITY STATEMENT

This is a Continuation of International Application PCT/JP95/02102, with an international filing date of Oct. 13, 1995, which designated the United States and is now abandoned.

FIELD OF THE INVENTION

The present invention relates to a rotor for a rotating machine, a process for producing the same, and a magnet unit.

The rotating machine includes a motor and a generator.

The rotor of this type is comprised of a rotor body, and a plurality of permanent magnets bonded to the rotor body. In this case, the coefficient of linear thermal expansion of the rotor body is different from that of each permanent magnet. In producing the rotor, a process is employed which includes bonding the rotor body and the plurality of permanent magnets through a heating step and a subsequent cooling step.

BACKGROUND ART

There is a conventionally known rotor of this type including permanent magnets bonded to a rotor body made of a steel using a synthetic resin adhesive (see Japanese Patent Application Laid-open No.4-101640).

The reason why the synthetic resin adhesive is used as described above is that a permanent magnet, particularly a permanent magnet including a rare earth element or elements is very brittle, resulting in a poor mechanical workability and has a nature that if when is exposed to a high temperature, its metallographic structure is changed and as a result, the magnetic characteristic is influenced. For this reason, in mounting the permanent magnets to the steel rotor body, a mounting means such as a dovetail-fit structure, screwing, welding and the like cannot be employed.

However, the bonding using the synthetic resin is accompanied by a problem that the temperature of the rotor rises with operation of the rotating machine, and if the temperature of the rotor rises, for example, to 100° C., the bond strength of the permanent magnet is significantly reduced. Under such a situation, it is impossible to absolutely accommodate the demand for an increase in rotational speed of the motor.

On the other hand, in bonding the rotor body and the permanent magnets, it is considered that a brazing method having a large degree of freedom in selection of the bonding temperature is utilized. In this case, however, there is a possibility that cracks may be produced in the permanent magnet at a cooling step after a heating step, because the coefficient of linear thermal expansion of the steel rotor body is larger than that of the permanent magnet.

SUMMARY OF THE INVENTION

Accordingly, it is an object of the present invention to provide a producing process of the above-described type for producing a rotor by heating and bonding a rotor body and permanent magnets to each other, wherein it is possible to avoid the production of cracks in the permanent magnets having a smaller coefficient of linear thermal expansion at the cooling step.

To achieve the above object, according to the present invention, there is provided a process for producing a rotor for a rotating machine by bonding a rotor body and a plurality of permanent magnets having different coefficient of linear thermal expansion at joint surfaces thereof through a heating step and a subsequent cooling step, wherein the rotor body having a larger coefficient of linear thermal expansion at the cooling step has its joint surface formed by assembling a plurality of small joint faces.

In such producing process, the rotor body and the permanent magnets are expanded at the heating step, for example, so that their lengths become longer than those before the heating. Each of the small joint face forming portions in the rotor body having the larger coefficient of linear thermal expansion at the cooling step is shrunk and bonded to each of the permanent magnets and hence, a gap is produced between adjacent ones of the small joint face forming portions. As a result, the rotor body is restrained in a state in which its length is longer than that before the heating.

Thus, a thermal stress produced in a bonded area between the rotor body and each of the permanent magnets is moderated, as compared with a case where the length of the rotor body is restored substantially to the length before the heating. Therefore, it is possible to avoid a disadvantage that cracks are produced in the permanent magnet, even if the permanent magnet is brittle.

It is another object of the present invention to provide a rotor for a rotating machine, wherein even if the temperature of the rotor rises to a relatively high level, the bond strength of the permanent magnets is not injured thereby, and it is possible to avoid cracks produced in the permanent magnets due to the rising and lowering of the temperature of the rotor.

To achieve the above object, according to the present invention, there is provided a rotor for a rotating machine, comprising a cylindrical rotor body formed by laminating a plurality of steel plates, and a plurality of permanent magnets each bonded to an outer peripheral surface of the rotor body through a brazing filler metal layer, the permanent magnets each extending in a direction of a generatrix of the outer peripheral surface of the rotor body with a spacing being provided between adjacent ones of the permanent magnets, wherein permanent magnet bonding portions in the plurality of steel plates at least on the side of axially opposite ends of the rotor body are bent outwards of the rotor body because of slits existing on opposite sides of each of the permanent magnet bonding portions, thereby providing gaps between axially adjacent ones of said permanent magnet bonding portions.

In such rotor, each of the permanent magnets is bonded to the rotor body through the brazing filler metal layer. Therefore, even if the temperature of the rotor rises to a level causing a reduction in the bond strength of a synthetic resin adhesive, e.g., 100° C. with operation of the rotating machine, the bond strength of the permanent magnets is not injured.

On the other hand, a thermal stress is concentrated on an outer periphery of the rotor body on its axially opposite end sides in accordance with rising and lowering in the temperature of the rotor. With the above construction, the gaps exist between the adjacent permanent magnets in the plurality of steel plates in the outer periphery at the opposite end sides of the rotor. Therefore, the expansion and shrinkage of the permanent magnet bonding portions are absorbed by the gaps, thereby moderating the thermal stress in the outer periphery at the opposite end sides and hence, cracks cannot be produced in each of the permanent magnets.

It is a further object of the present invention to provide the producing process of the above-described type, wherein a rotor for a rotating machine having the above-described characteristic can be produced without producing cracks in each permanent magnet.

To achieve the above object, according to the present invention, a process is provided for producing a rotor for a rotating machine, the rotor comprising a cylindrical rotor body formed by laminating a plurality of steel plates, and a plurality of permanent magnets each bonded to an outer peripheral surface of the rotor body through a brazing filler metal layer, the adjacent permanent magnets being spaced apart from each other, the permanent magnets each extending in a direction of a generatrix of the outer peripheral surface of the rotor body with a spacing being provided between adjacent ones of the permanent magnets, the process comprising the steps of preparing a rotor body formed by laminating the steel plates each having slits extending inwards from an outer peripheral surface of the steel plate on opposite sides of each of the permanent magnet bonding portions of the rotor body; superposing each of the permanent magnets onto each of the permanent magnet bonding portions of the rotor body through the brazing filler metal layer; and bonding each of the permanent magnets to the rotor body through the brazing filler metal layer under heating.

In the course of production of the rotor, the rotor body and each of permanent magnets are expanded under heating, so that for example, the thickness of each of the steel plates becomes larger than that before the heating, and the length of each of the permanent magnets is longer than that before the heating. During cooling, each of the steel plates in the rotor body is shrunk and bonded to each of the permanent magnets and hence, permanent magnet bonding portions located on the side of one end from a position axially bisecting the rotor body and permanent magnet bonding portions located on the side of the other end are bent or flexed in the directions away from each other, namely, outwards of the rotor body because of the slits. As a result, gaps are produced between the axially adjacent permanent magnet bonding portions and hence, the portion of the rotor body on the side of the permanent magnet bonding portions is restrained in a state in which its length is larger than that before the heating.

Thus, the thermal stress generated in the permanent magnet is moderated, as compared with the case where the length of the portion of the rotor body on the side of the permanent magnet is restored substantially to the length before the heating. Therefore, even if the permanent magnet is brittle, cracks cannot be produced in the permanent magnet.

It is a yet further object of the present invention to provide a rotor of the above-described type for a rotating machine, wherein the bond strength of each of the permanent magnets is high and, even if the temperature of the rotor rises, that bond strength cannot be injured thereby, and moreover, a high reliability is obtained for the bonded structure of each permanent magnet.

To achieve the above object, according to the present invention, there is provided a rotor for a rotating machine, comprising a rotor body, and a plurality of magnet units mounted to an outer peripheral surface of the rotor body, each of the magnet units comprising a pedestal mounted to the rotor body, and a permanent magnet bonded to the pedestal through a brazing filler metal layer under heating.

In the above rotor, a bonding method using a brazing filler metal is employed for bonding each of the permanent magnets. Therefore, the bond strength of each of the permanent magnets is high and, even if the temperature of the rotor rises to a level reducing the bond strength of a synthetic resin adhesive, e.g., 100° C. in accordance with operation of the rotating machine, the bond strength of each of the permanent magnets cannot be injured.

Moreover, it is possible to carry out the mounting of each of the magnet units to the rotor body after confirmation of the state of permanent magnet bonded to the pedestal and hence, a high reliability is obtained for the bonded structure of each of the permanent magnets in the rotor.

Further, it is another object of the present invention to provide a producing process of the above-described type, wherein the productivity and yield of the rotor for the rotating machine can be enhanced.

To achieve the above object, according to the present invention, there is provided a process for producing a rotor for a rotating machine, comprising a step of forming a plurality of stacks each including a permanent magnet and a pedestal with a brazing filler metal interposed therebetween, a step of heating the stacks to provide a plurality of magnet units each including the permanent magnet and the pedestal bonded to each other through the brazing filler metal layer, and a step of mounting each of the magnet units to an outer periphery of a rotor body through the pedestal.

In producing each of the magnet units in the above producing process, the rising of the temperature to a level required for the bonding and the cooling after heating and bonding can be performed in a relatively short time, thereby shortening the time required for the bonding treatment, because each of the pedestal has a relatively small heat capacity.

In addition, since the mounting of each of the magnet units to the rotor body is conducted through the pedestal, the degree of freedom of selecting mounting means is high. For example, measures such as a dovetail-dovetail groove fitting, welding, screwing, caulking and the like can be employed, and such mounting can be easily performed.

Thus, an enhancement in productivity of the rotor is provided.

Further, since the measure of heating a stack comprised of the permanent magnet, the brazing filler metal and the pedestal is employed in the production of each of the magnet units, the heating of each of the stacks can be made uniform to suppress the generation of a bonding failure to the utmost, thereby providing an increase in yield of magnet units and accordingly of the rotor.

For example, if a method for heating and bonding the plurality of permanent magnets directly to the outer periphery of the rotor body by use of the brazing filler metal is used, the time required for the bonding treatment is about twice the time required for producing the magnet units in the same number of permanent magnets, because the rotor body has a relatively large heat capacity. When cracks are produced in one permanent magnet, there arises a wastefulness that such rotor is treated as a defective article. However, if the above-described magnet units are produced and used, the above problem can be avoided.

It is a yet further object of the present invention to provide a magnet unit of the above-described type, which contributes to an enhancement in productivity of a rotor for a rotating machine, and in which the generation of cracks in the permanent magnets due to the rising and lowering of the temperature of the rotor can be avoided.

To achieve the above object, according to the present invention, there is provided a magnet unit comprising a pedestal formed by laminating a plurality of steel plates, and a permanent magnet bonded to the pedestal through a brazing filler metal layer under heating, gaps being produced by heating and bonding between adjacent ones of the steel plates at least on opposite end sides of the pedestal in a direction of lamination of the steel plates.

The above magnet unit is easily mounted to a rotor body through the pedestal. This contributes to an enhancement in productivity of the rotor.

A thermal stress is concentrated on the opposite end sides of the pedestal in the direction of lamination of the steel plates with the rising and lowering of the temperature of the rotor. However, the gaps exist between the adjacent steel plates on these opposite end sides and hence, the expansion and shrinkage of the steel plates can be absorbed by the gaps, thereby moderating the thermal stress in the opposite end sides to avoid the generation of cracks in the permanent magnet.

BRIEF DESCRIPTION OF THE DRAWINGS

FIG. 4 being a view before heating, FIG. 5 being a view during heating, and FIG. 6 being a view after cooling;

FIG. 7 being a view before heating, FIG. 8 being a view during heating, and FIG. 9 being a view after cooling;

DETAILED DESCRIPTION OF THE PRESENT INVENTION

First Embodiment

Figure 1:
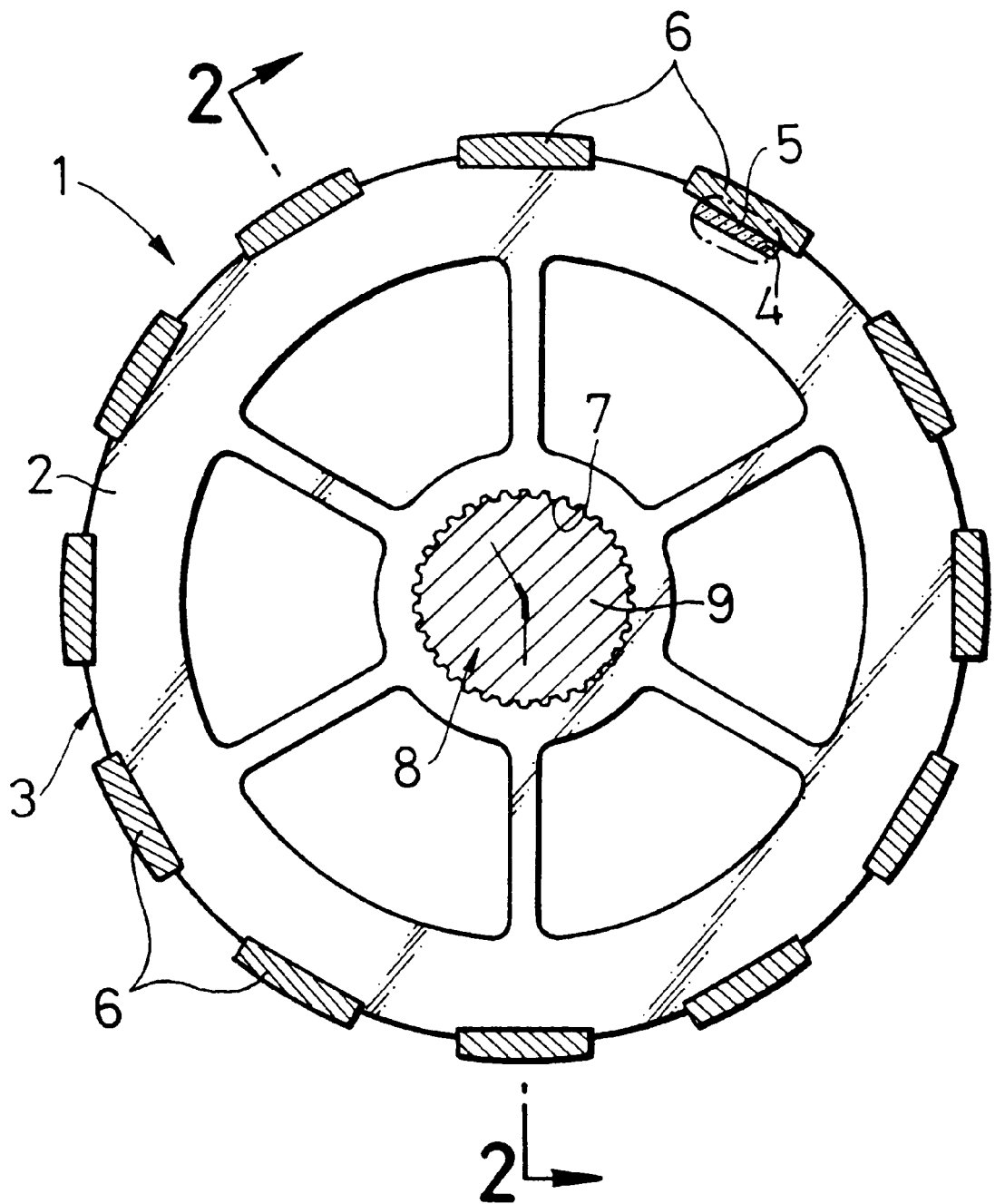
FIG. 1 is a sectional view illustrating a first embodiment of a rotor for a motor, taken along a line 1—1 in FIG. 2.
Figure 2:
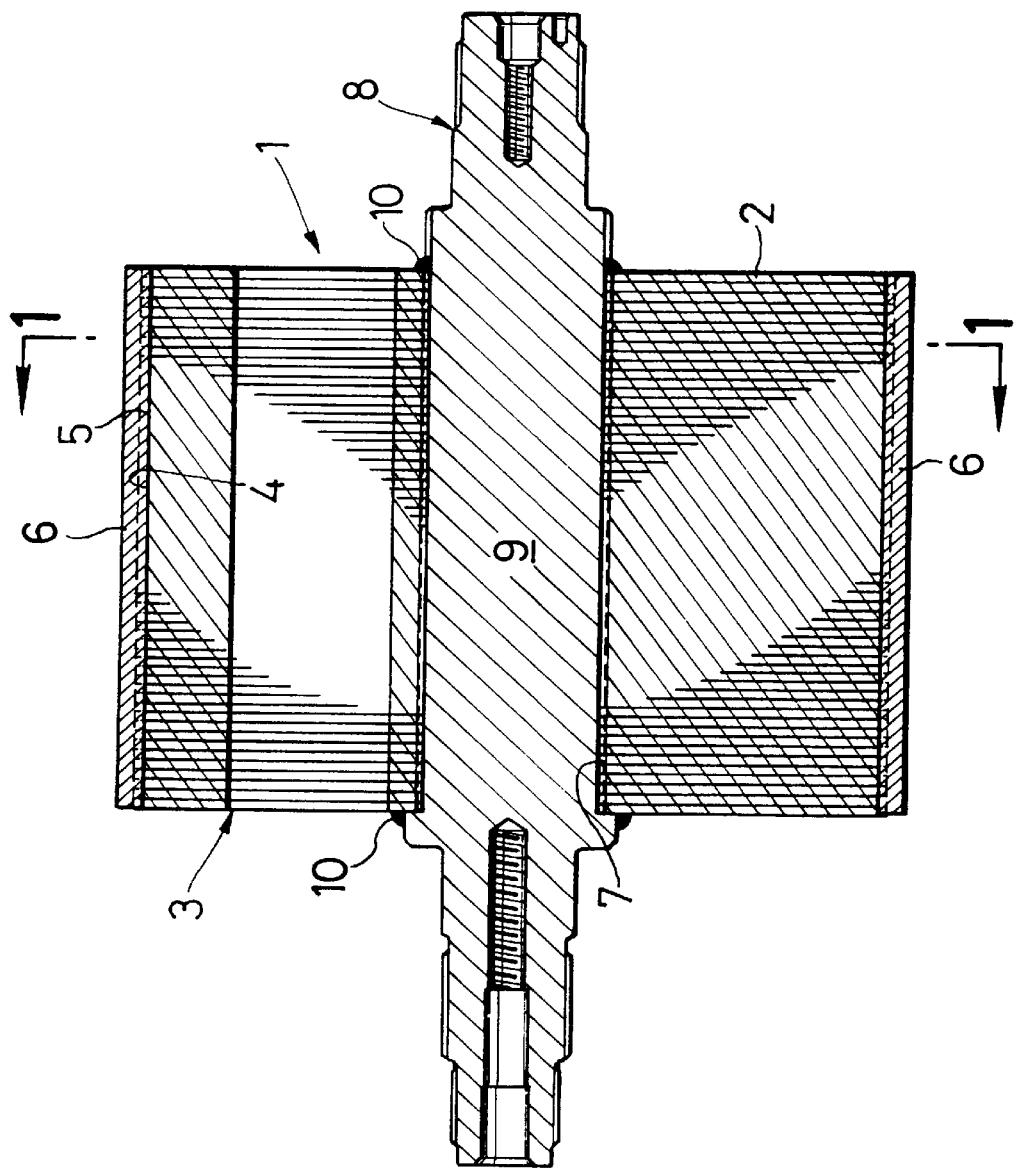
FIG. 2 is a sectional view taken along a line 2—2 in FIG. 1.

Referring to FIGS. 1 and 2, a rotor 1 for a motor serving as a rotating machine is comprised of a cylindrical rotor body 3 which is a laminate which is formed by laminating a plurality of circular steel plates 2 one on another, and a plurality of magnets 6 bonded to an outer peripheral surface of the rotor body 3, i.e., a joint surface 4 with a brazing filler metal layer 5 interposed therebetween. A brazing filler metal forming the brazing filler metal layer 5 produces a liquid phase at a temperature lower than melting points f the rotor body 3 and the permanent magnet 6. A spline shaft portion 9 of a rotor shaft 8 is press-fitted into a spline bore 7 located at the center of the rotor body 3, and edges of opposite openings in the spline bore 7 are secured to the rotor shaft 8 through weld zones 10.

Figure 3:
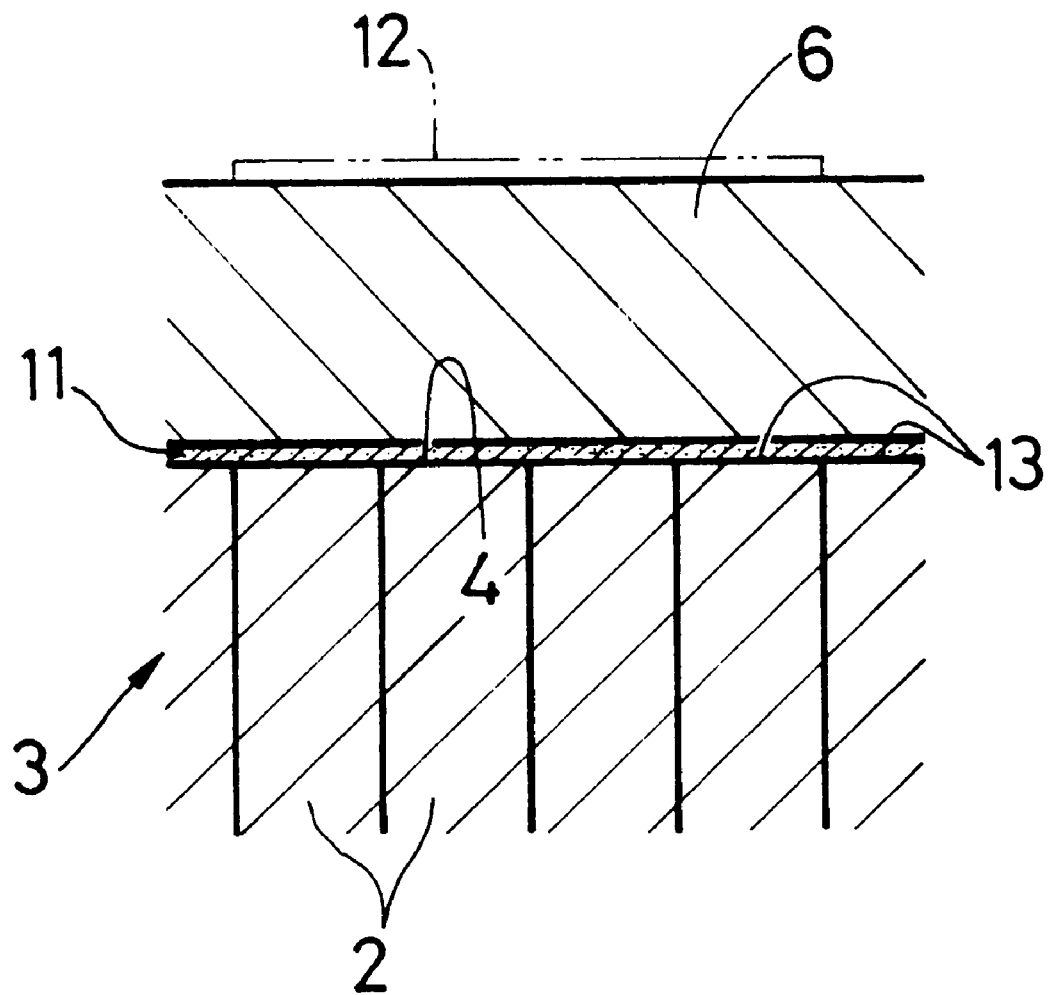
FIG. 3 is a sectional view of an essential portion illustrating the relation of superposition of a permanent magnet, a brazing filler metal and a rotor body.

In producing the rotor 1, the following steps are employed: a step of placing permanent magnets 6 onto the joint surface 4 of the rotor body 3 with a foil-like or a thin plate-like brazing filler metal 11 interposed therebetween, as shown in FIG. 3, and then, winding a heat-resistant band 12 around the rotor body 3 to fix the permanent magnets 6 and the brazing filler metal 11 to the rotor body 3, thereby providing a stack; a step of placing the stack into a vacuum heat treating furnace; a step of heating the brazing filler metal 11 into a liquid phase state or a solid-liquid coexisting phase state, and a step of cooling the stack in the furnace to bond the permanent magnets 6 and the rotor body 3 through the brazing filler metal layer 5 to produce the rotor 1.

At the cooling step, the coefficient of linear thermal expansion of the rotor body 3 is larger than that of the permanent magnets 6. The joint surface 4 of the rotor body 3 is formed by congregation of small joint faces 13 which are end faces of the steel plates 2.

Figure 4:
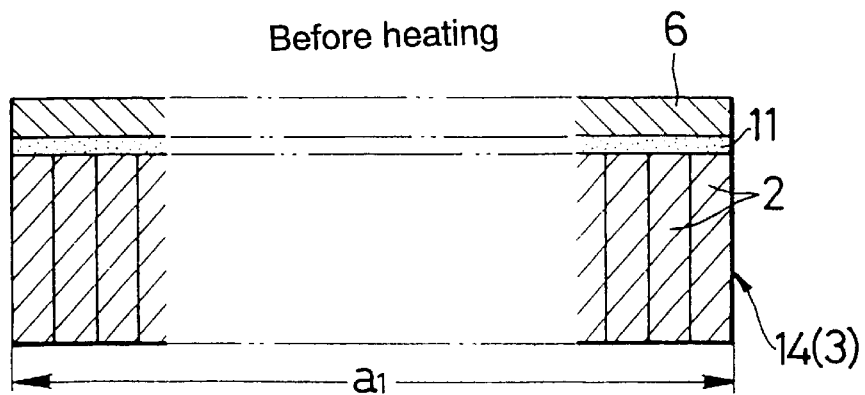
FIGS. 4 to 6 are views for explaining a heating/bonding mechanism in one embodiment.
Figure 5:
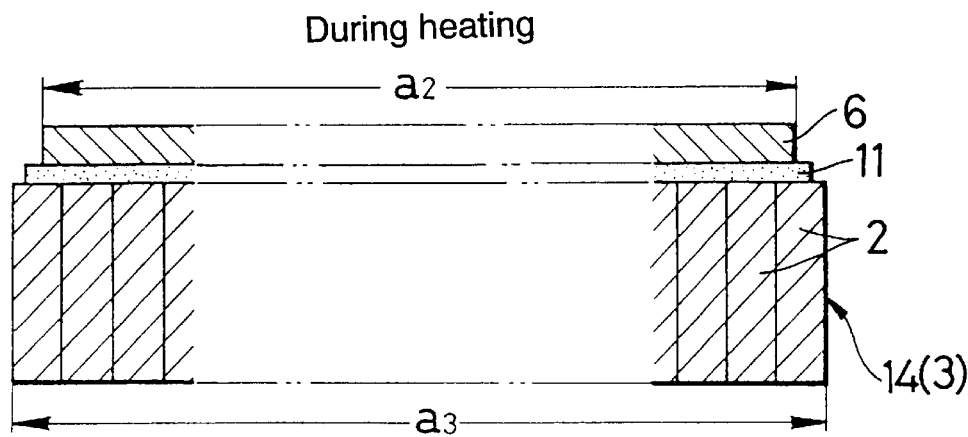
Figure 6:
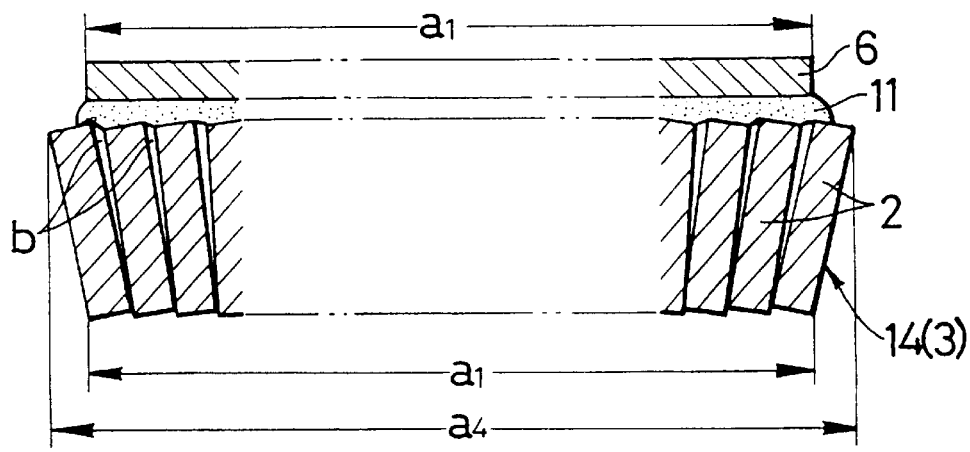

FIGS. 4 to 6 illustrate a heat-bonding mechanism. Before the heating as shown in FIG. 4, the lengths $a_1$, of the permanent magnet 6 and the laminate 14 as a substitute of the rotor body 3, which constitute the stack are equal to each other. During the heating as shown in FIG. 5, the permanent magnet 6 and the laminate 14 are expanded, so that their lengths $a_2$ and $a_3$ are larger than the length $a_1$, before the heating, i.e., $a_2 > a_1$ and $a_3 > a_1$ (with the proviso that $a_3 > a_2$). After the cooling as shown in FIG. 6, the steel plates 2 which each of small joint face forming portions of the laminate 14 having a large coefficient of linear thermal expansion are shrunk and bonded to the permanent magnet 6 at the cooling step and hence, a gap b is produced between the adjacent steel plates 2 on the side of the permanent magnet 6. As a result, the laminate 14 on the side of the permanent magnet 6 is restrained in a state in which its length $a_4$ is larger than the length $a_1$, before the heating, i.e., $a_4 > a_1$ (for example, $a_4 \approx 1.01 \times a_1$).

Figure 7:
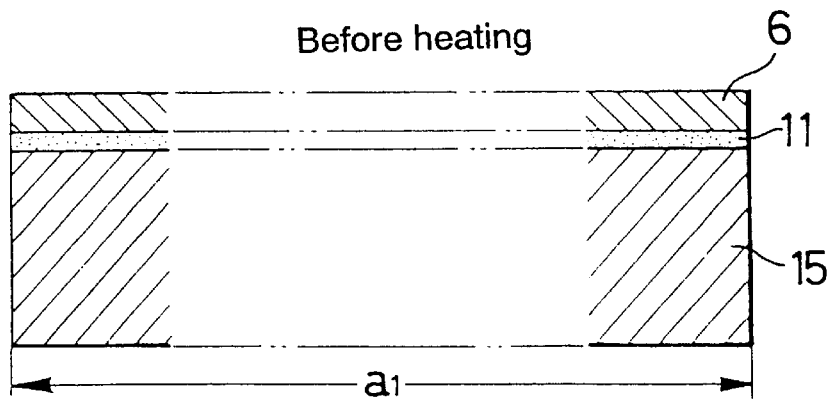
FIGS. 7 to 9 are views for explaining a heating/bonding mechanism in a comparative example.
Figure 9:
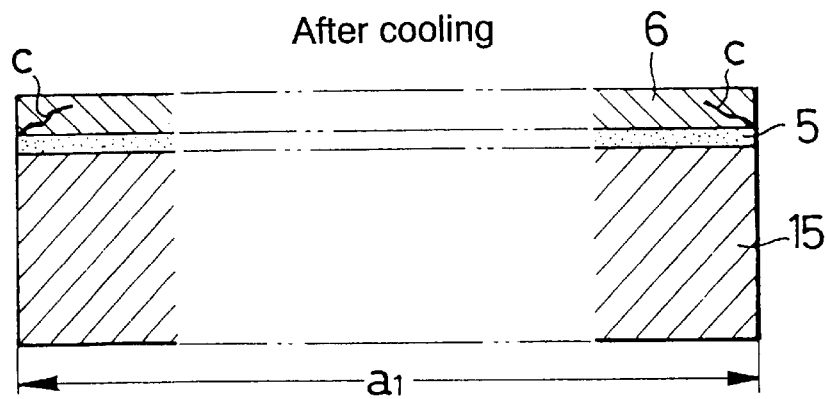

Thus, as compared with a case where the length $a_3$ of a block 15 made of a steel during heating is restored substantially to the length $a_1$ provided before the heating after the cooling, as a comparative example in FIGS. 7 and 9, the thermal stress generated in the brazing filler metal layer 5 is moderated. Therefore, even when the permanent magnet 6 is brittle, it is possible to avoid a disadvantage that cracks c as shown in FIG. 9 are produced.

The permanent magnets 6 which may be used are those containing a rare earth element or elements such as NdFeB-based permanent magnet, an SmCo-based permanent magnet and the like.

The brazing filler metal 11, which may be used, must be hose which exhibit a bonding force at a heating temperature d exerting no influence to the magnetic characteristic of the permanent magnet 6 containing a rare earth element as described above, namely in a range of $d \leq 650°$ C. It is required that when the brazing filler metal 11 is in its solid phase state under heating, the bonding force is produced by diffusion of the brazing filler metal 11, and when the brazing filler metal 11 is in its liquid phase state or in its solid-liquid coexisting state, the bonding force is produced by a wettability of the brazing filler metal 11.

From such viewpoint, a highly active brazing filler metal 11 formed from a rare earth element-based alloy is used. In the rare earth element-based alloy, it is desired that volume fraction Vf of an amorphous phase is in a range of $50\% \leq Vf \leq 100\%$. The reason is as follows: The amorphous phase is effective for enhancing the strength of the brazing filler metal layer 5, because of its characteristic that it has a considerably high oxidation resistance, because a grain boundary layer, which is an origin of oxidation, does not exist in the amorphous phase, and an oxide coexists in a very small amount and moreover, there is a segregation, leading to a uniform composition.

In this case, the rare earth element is at least one element selected from the group consisting of Y, La, Ce, Pr, Nd, Sm, Eu, Gd, Tb, Dy, Ho, Er, Tm, Yb and Lu. They may be used alone or in the form of Mm (a misch metal), Di (didymium) or the like which are a mixture of two or more of them. An alloy element AE is eutectic reaction with the rare earth element. The alloy element AE which may be used is at least one element selected from the group consisting of Cu, Al, Ga, Co, Fe, Ag, Ni, Au, Mn, Zn, Pd, Sn, Sb, Pb, Bi, Ge and In. The content of the alloy element AE is set in a range of 5% by atom $\leq AE \leq 50\%$ by atom. When the rare earth element-based alloy forming the permanent magnet contains two or more alloy elements AE, the total content of the alloy elements AE is in a range of 5% by atom $\leq AE \leq 50\%$ by atom. However, if the content of the alloy element(s) AE is larger than 50% by atom (AE>50% by atom), the activity of the rare earth element-based alloy is injured. On the other hand, if AE<5% by atom, it is difficult to insure the liquid phase in the solid-liquid phase coexisting state.

Eutectic alloys among the rare earth element-based alloys are as given in Table 1.

TABLE 1

| Rare earth element (% by atom) | | Alloy element (% by atom) | | Eutectic point (° C.) |
|---|---|---|---|---|
| Nd | 88 | Sn | 12 | 870 |
| | 88 | In | 12 | 880 |
| | 85 | Al | 15 | 635 |
| | 80 | Ag | 20 | 640 |
| | 80 | Ga | 20 | 651 |
| | 77 | Zn | 23 | 630 |

TABLE 1-continued

| Rare earth element (% by atom) | | Alloy element (% by atom) | | Eutectic point (° C.) |
|---|---|---|---|---|
| | 75 | Fe | 25 | 640 |
| | 75 | Mn | 25 | 700 |
| | 70 | Cu | 30 | 520 |
| | 64 | Co | 36 | 599 |
| Ho | 73 | Mn | 27 | 875 |
| Ce | 84 | Au | 16 | 520 |
| | 84 | Mn | 16 | 620 |
| | 82 | Ni | 18 | 470 |
| | 65.5 | | 34.5 | 453 |
| | 81.75 | Ga | 18.25 | 495 |
| | 72 | Cu | 28 | 424 |
| La | 95 | Sb | 5 | 845 |
| | 90 | Sn | 10 | 716 |
| | 86.5 | In | 13.5 | 742 |
| | 83 | Pb | 17 | 495 |
| | 80 | Ga | 20 | 550 |
| | 80 | Co | 20 | 520 |
| | 69 | | 31 | 541 |
| | 88 | Ge | 12 | 730 |
| | 75 | Zn | 25 | 530 |
| | 71 | Cu | 29 | 475 |
| | 69.6 | Bi | 30.4 | 820 |
| Sm | 80 | Pd | 20 | 692 |
| | 71 | Cu | 29 | 597 |
| Pr | 80.5 | Co | 19.5 | 570 |
| | 66 | | 34 | 541 |
| | 68 | Cu | 32 | 478 |

Examples of hypo and hypereutectic alloys among the rare earth element-based alloys are those described below, wherein the unit of numeral values in each of chemical formulae is % by atom (and so forth).

Figure 10:
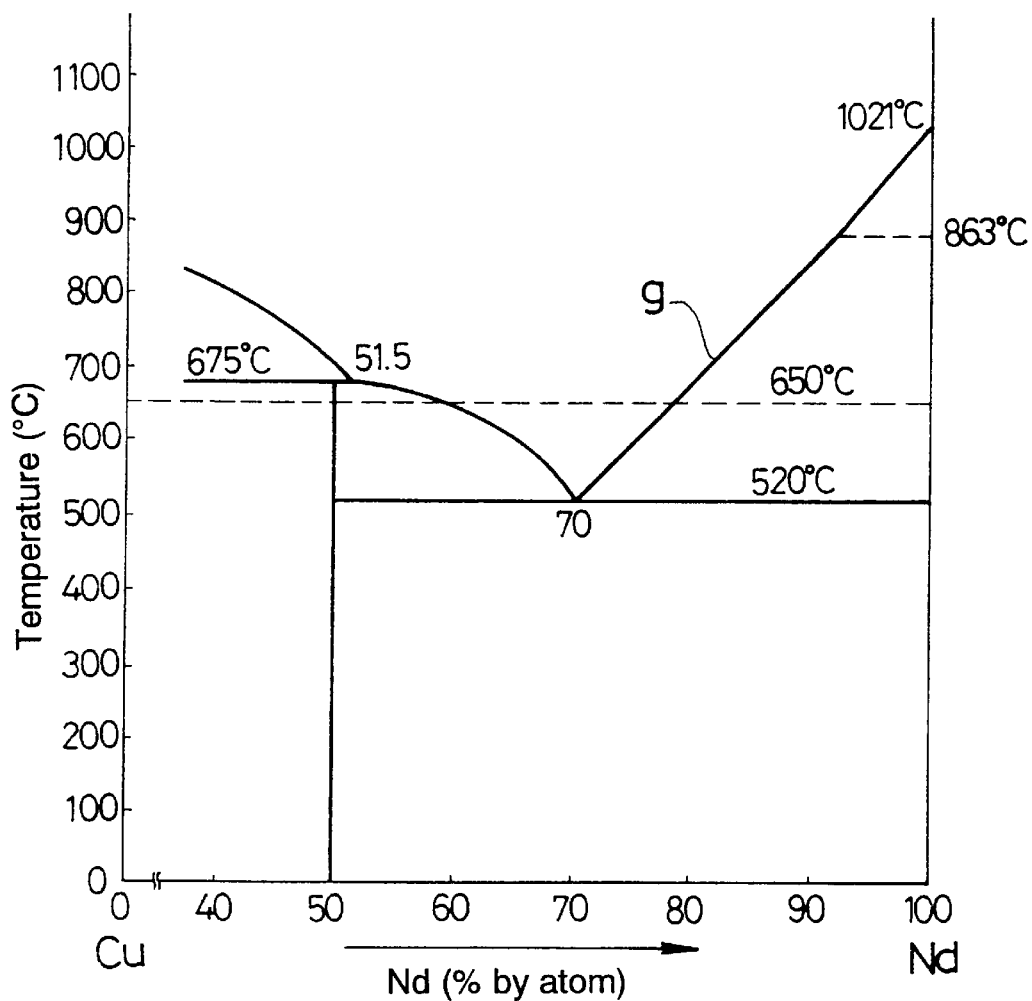
FIG. 10 shows an essential portion of a Cu—Nd system phase diagram.

(a) $Nd_{60}Cu_{40}$ alloy, $Nd_{73}Cu_{27}$ alloy, $Nd_{75}Cu_{25}$ alloy $Nd_{80}Cu_{20}$ alloy, $Nd_{50}Cu_{50}$ alloy: a liquid phase producing temperature of 520° C. (see FIG. 10)

(b) $Sm_{75}Cu_{25}$ alloy, $Sm_{65}Cu_{35}$ alloy: a liquid phase producing temperature of 597° C.

(c) $Nd_{90}Al_{10}$ alloy (a liquid phase producing temperature of 634° C.), $Nd_{80}Al_{20}$ alloy (a liquid phase producing temperature of 599° C.), $La_{85}Ga_{15}$ alloy (a liquid phase producing temperature of 550° C.)

Further, examples of ternary alloys are $Nd_{65}Fe_5Cu_{30}$ alloy (a liquid phase producing temperature of 501° C.; Fe has an effect of lowering the eutectic point), and $Nd_{70}Cu_{25}Al_5$ alloy (a liquid phase producing temperature of 474° C.).

The heating temperature d at the heating step is varied depending upon the composition of the brazing filler metal 11, but this cannot change the characteristics of the permanent magnet 6 and the rotor body 3, because each of the rare earth element-based alloy of the composition assumes the liquid phase state or the solid-liquid coexisting state at a relatively low heating temperature d.

The liquid phase produced by the brazing filler metal 11 containing a rare earth element as a predominant component is highly active and exhibits an excellent wettability to the permanent magnet 6 and the rotor body 3 made of a steel, which have a very poor wettability to an adhesive and a brazing filler metal. By using such a brazing filler metal 11, the permanent magnet 6 and the rotor body 3 can be firmly bonded to each other.

The heating time e exerts an influence to the characteristics of the permanent magnet 6 and the rotor body 3, if the heating time is too long. Therefore, it is desirable that the heating time e is equal to or shorter than 10 hours ($e \leq 10$ Hr). From the viewpoint of an enhancement in productivity, $e \leq 1$ Hr.

After the above-described heat-bonding treatment, each of permanent magnet 6 is subjected to magnetization. The same is true of embodiments which will be described hereinafter.

In the rotor body 3, the thickness f of each of the steel plates 2 is set in a range of 0.1 mm≦f≦6.0 mm. The reason why f≦0.1 mm is that the minimum thickness f of a steel plate 2 which is usually commercially available is equal to 0.1 mm. It is not that a steel plate 2 having a thickness f smaller than 0.1 mm is not commercially available, but such a steel plate 2 is not suitable for a mass production of the rotor body 3, because a large amount of extremely thick steel plates 2 are required for fabricating the rotor body 3. On the other hand, if f>6.0 mm, the thermal stress in the brazing filler metal layer 5 cannot be moderated enough and for this reason, cracks c are liable to be produced in the permanent magnet 6. A. The following experiment was carried out for the purpose of examining cracks in the permanent magnet 6 during heat-bonding.

Neodymium (Nd) having a purity of 99.9% and Copper (Cu) having a purity of 99.9% were weighed so that $Nd_{70}Cu_{30}$ alloy having an eutectic composition was produced. Then, the weighed neodymium and copper were molten in a vacuum melt treating furnace and subjected to a casting to produce an ingot having a size of 10 mm long, 20 mm wide and 100 mm length. The ingot was subjected to a cutting by a micro-cutter along a longitudinal direction to produce a thin plate-like brazing filler metal 11 having a size of 20 mm long, 100 mm wide and 0.3 mm thick made of $Nd_{70}Cu_{30}$ alloy as shown in FIG. 11.

Figure 11:
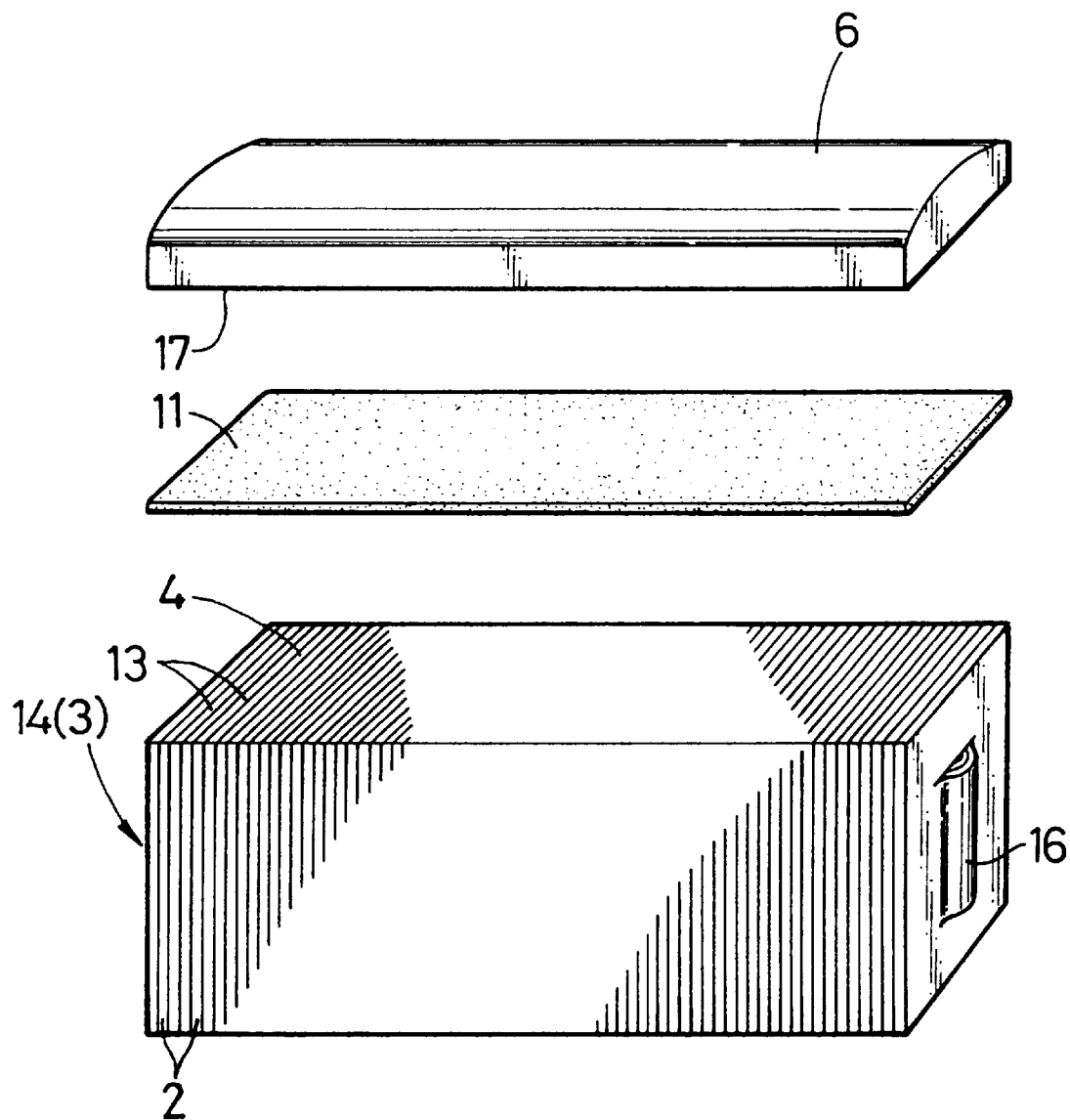
FIG. 11 is a perspective view illustrating one example of a relation of superposition of a permanent magnet, a brazing filler metal and a laminate.

An NdFeB-based permanent magnet having a size of 20 mm long, 100 mm wide and 6 mm thick (made under a trade name of NEOMAX-28UH by Sumitomo Tokushu Kinzoku, Co., Ltd., and having a melting point of 1220° C. and Curie point of 350° C.) was selected as permanent magnet 6 as shown in FIG. 11, and a rectangular parallelepiped laminate 14 having a size of 20 mm×40 mm×100 mm and made by laminating cold rolled steel plates 2 (each having a melting point of 1,538° C.) having a thickness f of 0.6 mm as shown in FIG. 11 was selected as a substitute of the rotor body 3. A caulking means 16 was used to bond these steel plates 2.

Referring to FIG. 11, a brazing filler metal 11 was superposed onto a joint surface 4 of the laminate 14, and a permanent magnet 6 was superposed with its joint surface 17 turned downwards onto the brazing filler metal 11. A resulting stack was placed into a vacuum heat treating furnace and subjected to a heating step for a heating time e of 20 minutes at a heating temperature d of 530° C. and then to a cooling step using a furnace cooling, whereby the permanent magnet 6 and the laminate 14 were bonded to each other through a brazing filler metal layer 5. In this heating and bonding treatment, the heating temperature d is equal to 530° C. and exceeds an eutectic point of 520° C. shown in FIG. 10 and hence, the brazing filler metal 11 was brought into a liquid phase state, because it had an eutectic composition.

No crack was produced in an assembly of the bonded permanent magnet 6 and laminate 14 made in the above manner, and the permanent magnet 6 and the laminate 14 were firmly bonded to each other through the brazing filler metal layer 5. This is because the thermal stress produced in the brazing filler metal layer 5 at the cooling step after the heating step was moderated by the fact that laminate 14 was used, as described above.

Figure 8:
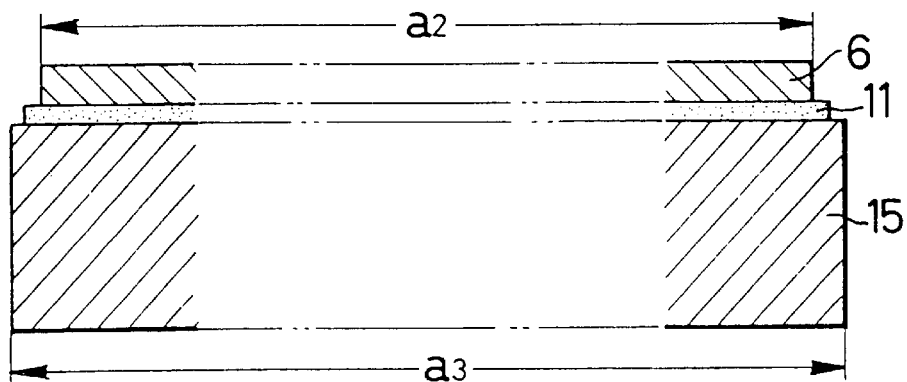

For comparison, a block 15 made of a carbon steel (JIS s35C) used in place of the laminate 14 and having the same size as the laminate 14 was fabricated, as shown in FIGS. 7 to 9. The block 15 and a permanent magnet 6 similar to that described above were heated and bonded to each other using a brazing filler metal similar to that described above under the same conditions as those described above.

Figure 12:
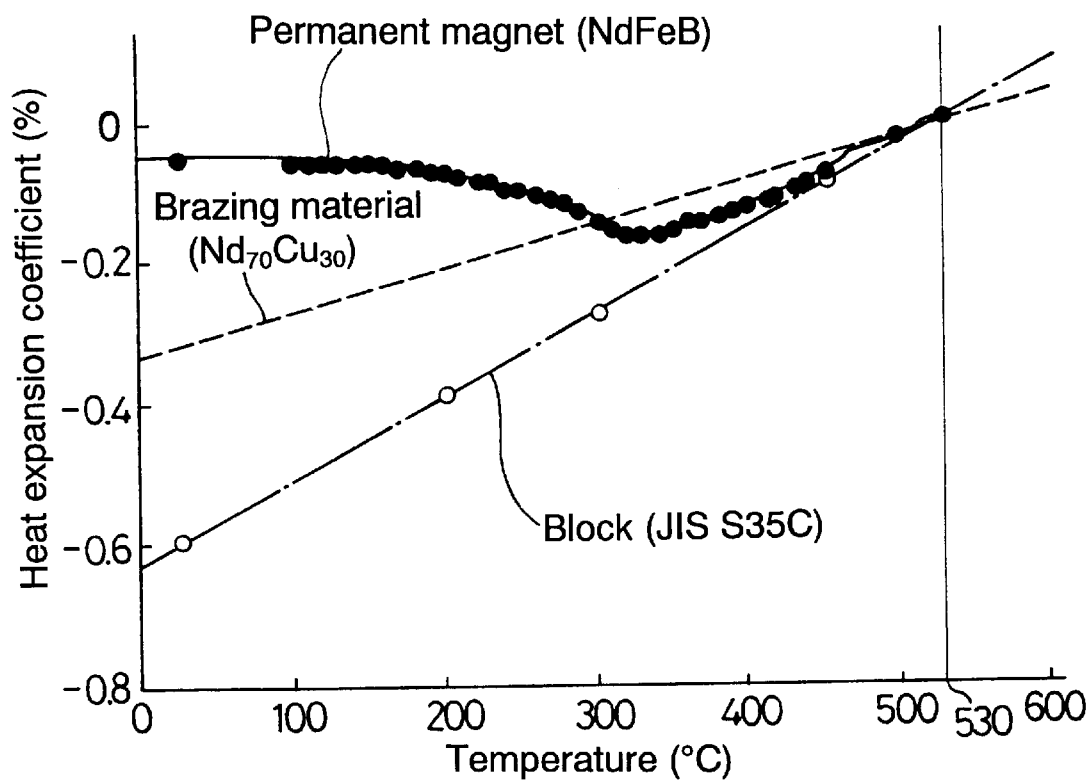
FIG. 12 is a graph illustrating the relationship between the temperature and the coefficient of linear thermal expansion.

FIG. 12 illustrate the relationship between the temperature and the coefficient of linear thermal expansion in the permanent magnet 6, the brazing filler metal 11 and the block 15.

As apparent from FIG. 12, it can be seen that the block 15 has a large coefficient of linear thermal expansion at a cooling step, as compared with the permanent magnet 6. Due to this, cracks c as shown in FIG. 9 were produced in the entire permanent magnet 6 in the assembly made using the block 15, and a peripheral portion of the permanent magnet 6 with the thermal stress concentrated thereon was smashed into pieces.

The laminate 14 also has a coefficient of linear thermal expansion similar to that of the block 15, but the problem arisen when the block 15 is used, is avoided, because a thermal stress moderating effect as described above is provided by the lamination structure. B. The following experiment was carried out to examine the strength of bonding between the permanent magnet 6 and the rotor body 3.

Neodymium (Nd) having a purity of 99.9% and Copper (Cu) having a purity of 99.9% were weighed so that $Nd_{73}Cu_{27}$ alloy having a hypereutectic composition was produced. Then, the weighed neodymium and copper were molten in a vacuum melt treating furnace and subjected to a casting to produce an ingot having a size of 15 mm×15 mm×30 mm. The ingot was subjected to a cutting by a micro-cutter to produce a thin plate-like brazing filler metal 11 having a size of 15 mm long, 15 mm wide and 0.3 mm thick made of $Nd_{73}Cu_{27}$ alloy.

An NdFeB-based permanent magnet (made under a trade name of NEOMAX-28UH by Sumitomo Tokushu Kinzoku, Co., Inc., and having a Curie point of 350° C.) similar to that described above and having a size of 15 mm long, 15 mm wide and 5 mm thick was selected as permanent magnet 6. A rectangular parallelepiped laminate 14 having a size of 15 mm×15 mm×20 mm and made by laminating cold rolled steel plates 2 having a thickness f of 0.8 mm was selected as a substitute of the rotor body 3.

Figure 13:
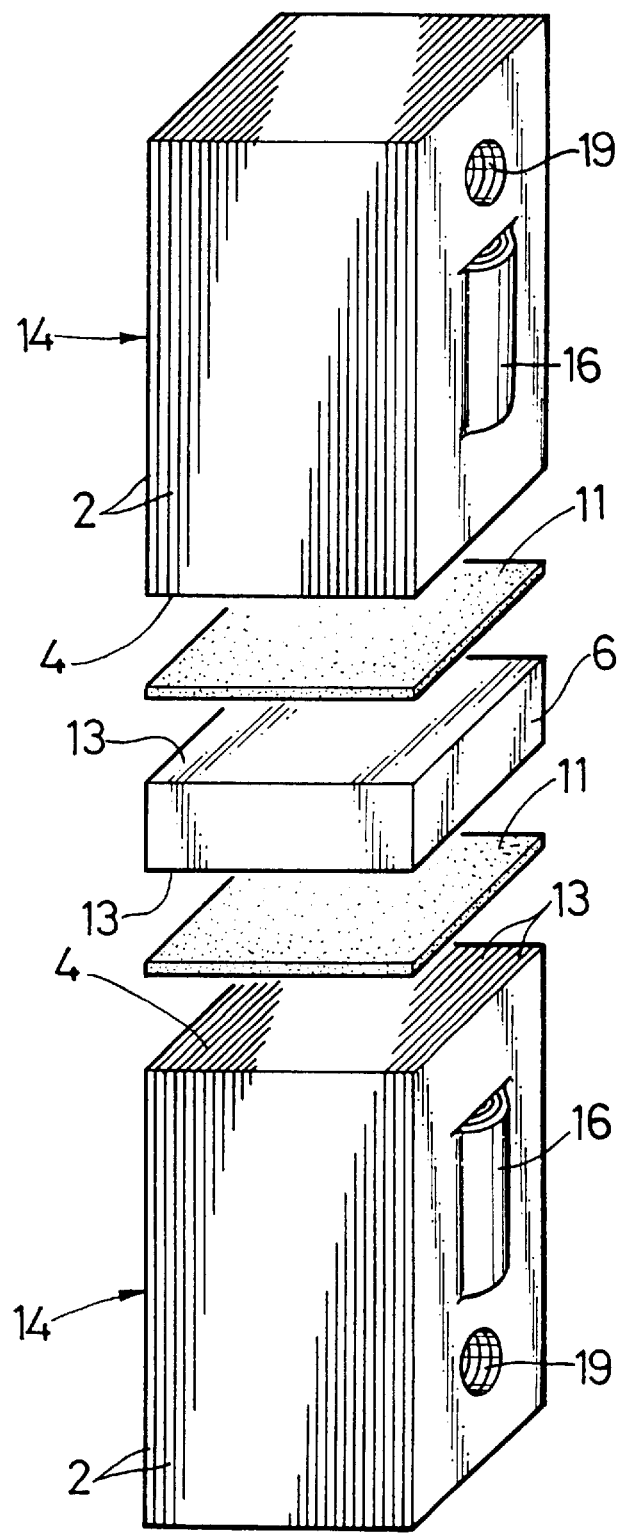
FIG. 13 is a perspective view illustrating another example of the relation of superposition of a permanent magnet, a brazing filler metal and a laminate.
Figure 14:
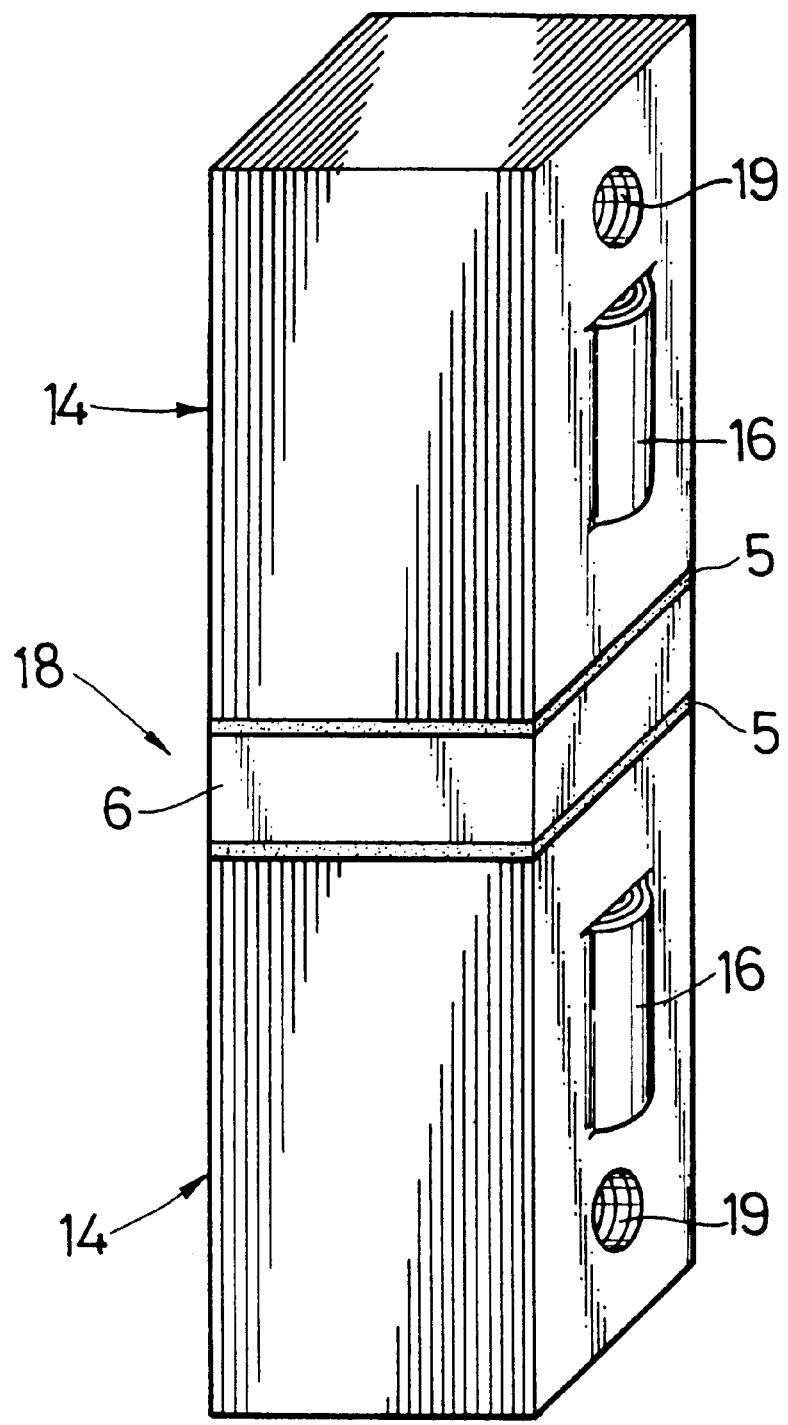
FIG. 14 is a perspective view of an assembly resulting from the bonding.

As shown in FIG. 13, a brazing filler metal 11 was superposed onto a joint surface 4 of a laminate 14, and a permanent magnet 6 with one joint surface turned upwards was superposed onto the brazing filler metal 11. Further, another brazing filler metal 11 was superposed onto the other joint surface of the permanent magnet 6 and another laminate 14 with its joint surface 4 turned downwards was superposed onto the other brazing filler metal 11, thereby producing a stack. A total of 20 stacks were produced in the same procedure. Then, the stacks were placed into a vacuum heating furnace and the heating temperature d is equal to 580° C. subjected to a heating step for a heating time of 20 minutes and then to a cooling step by a furnace cooling to produce 20 assemblies of permanent magnet 6 and laminates 14 bonded through the brazing filler metal layer 5 in such a manner that the permanent magnet 6 was sandwiched between the two laminates 14, as shown in FIG. 14. In this heat-bonding treatment, the heating temperature d is equal to 580° C. and exists in a temperature range between an eutectic point of 520° C. and a liquid phase line g shown in FIG. 10. Therefore, the brazing filler metal 11 was brought into a solid-liquid coexisting state. Through-bores 19 provided respectively in the two laminates 14 were used for connection with a chuck in a tensile test.

For comparison, a permanent magnet 6 similar to the above-described magnet and two laminates 14 similar to those described above were superposed to each other with an epoxy resin-based adhesive (made under a trade name of Araldite by Ciba-Geigy Japan Corp.) interposed therebetween to produce a stack. A total of 20 stacks were produced in the same procedure. Then, the stacks were placed into a drying furnace and subjected to a heating step at a heating temperature of 200° C. for a heating time of 60 minutes and then to a bonding step using a furnace cooling to produce 20 assemblies of the two laminates 14 and a permanent magnet 6 bonded through the epoxy resin-based adhesive.

The 10 assemblies 18 made using the brazing filler metal 11 and the 10 assemblies made using the epoxy resin-based adhesive were subjected to a tensile test under room temperature. The 10 remaining assemblies were subjected to a tensile test under heating at 150° C. Thus, results given in Table 2 were obtained.

TABLE 2

| Assembly | Tensile strength (kgf/mm$^2$) | | | |
|---|---|---|---|---|
| | Room temperature | Standard deviation | 150° C. | Standard deviation |
| Case where brazing material was used | 3.1 | 0.5 | 3.0 | 0.5 |
| Case where adhesive was used | 1.5 | 0.9 | 0.5 | 0.2 |

As apparent from Table 2, the bond strength of the assembly 18 made using the brazing filler metal 11 was high under room temperature and heating at 150° C., as compared with the assembly made using the epoxy resin-based adhesive, and was little varied and less scattered under both of the environments of room temperature and 150° C. The bond strength of the assembly made using the adhesive was low under room temperature and largely scattered, and was decreased to one third of the value provided under room temperature, under heating at 150° C.

The magnetic characteristic, particularly the coercive force $_IH_C$ (the magnetization intensity I=0) of the permanent magnet 6 containing the rare earth element such as NdFeB-based permanent magnet, SmCo-based permanent magnet and the like tends to decrease if the heating temperature d during bonding treatment is higher than 650° C. However, the residue flux density Br and the coercive force $_BH_C$ (the flux density=0) are little varied and hence, the maximum energy product (BH)max is substantially constant. In the heat-bonding treatment using the brazing filler metal 11, the heating temperature d is equal to 530° C. or 580° C., i.e., d≦650° C. Therefore, the heating temperature cannot exert an influence to the magnetic characteristic of the permanent magnet 6.

The poor wettability of the permanent magnet 6 is due to the presence of a phase having a high concentration of rare earth element, e.g., an Nd concentration in this embodiment, in the crystal boundary of the permanent magnet 6. In the heat-bonding treatment using the brazing filler metal 11, the brazing filler metal 11 is in the liquid phase state or the solid-liquid coexisting state. The liquid phase produced from $Nd_{70}Cu_{30}$ alloy or $Nd_{73}Cu_{27}$ alloy containing Nd as a predominant component exhibits an excellent wettability to the permanent magnet 6, because it is highly active and contains the predominant component common to the high Nd-concentration phase existing in the crystal boundary. This liquid phase also has an extremely good wettability to the laminate 14 of steel plates 2 and thus to the rotor body 3 as a result of the increase in activity.

Therefore, the permanent magnet 6 and the rotor body 3 can be firmly bonded to each other without injuring the magnetic characteristic of the permanent magnet 6 by using a brazing filler metal 11 of the above-described type. This makes it possible to realize a high speed-rotating motor rotated at a number of rotations of 10,000 rpm or more.

A diffusion bonding using no brazing filler metal 11 is included in this embodiment.

Second Embodiment

Figure 15:
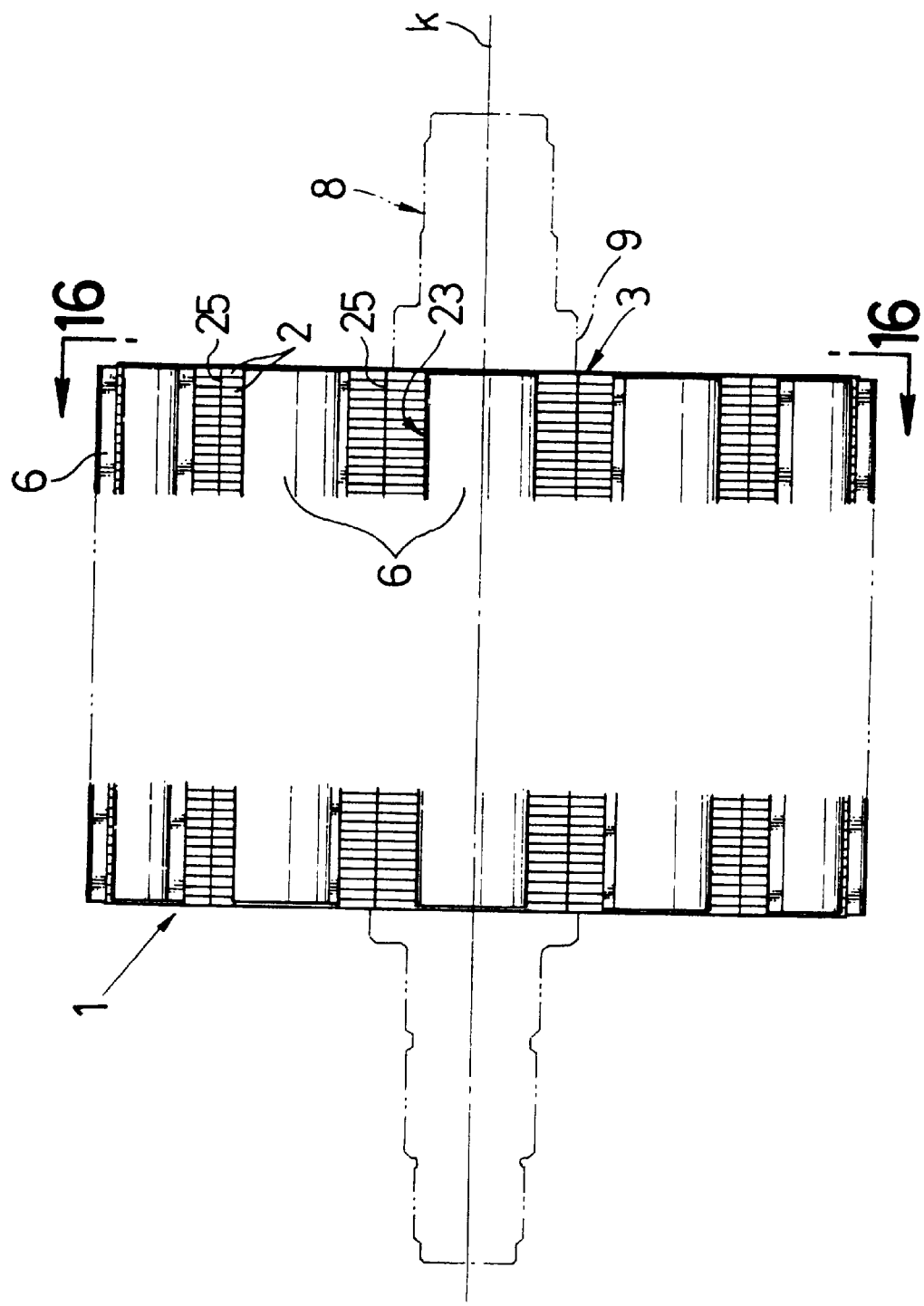
FIG. 15 is a front view illustrating a second embodiment of a rotor for a motor.
Figure 16:
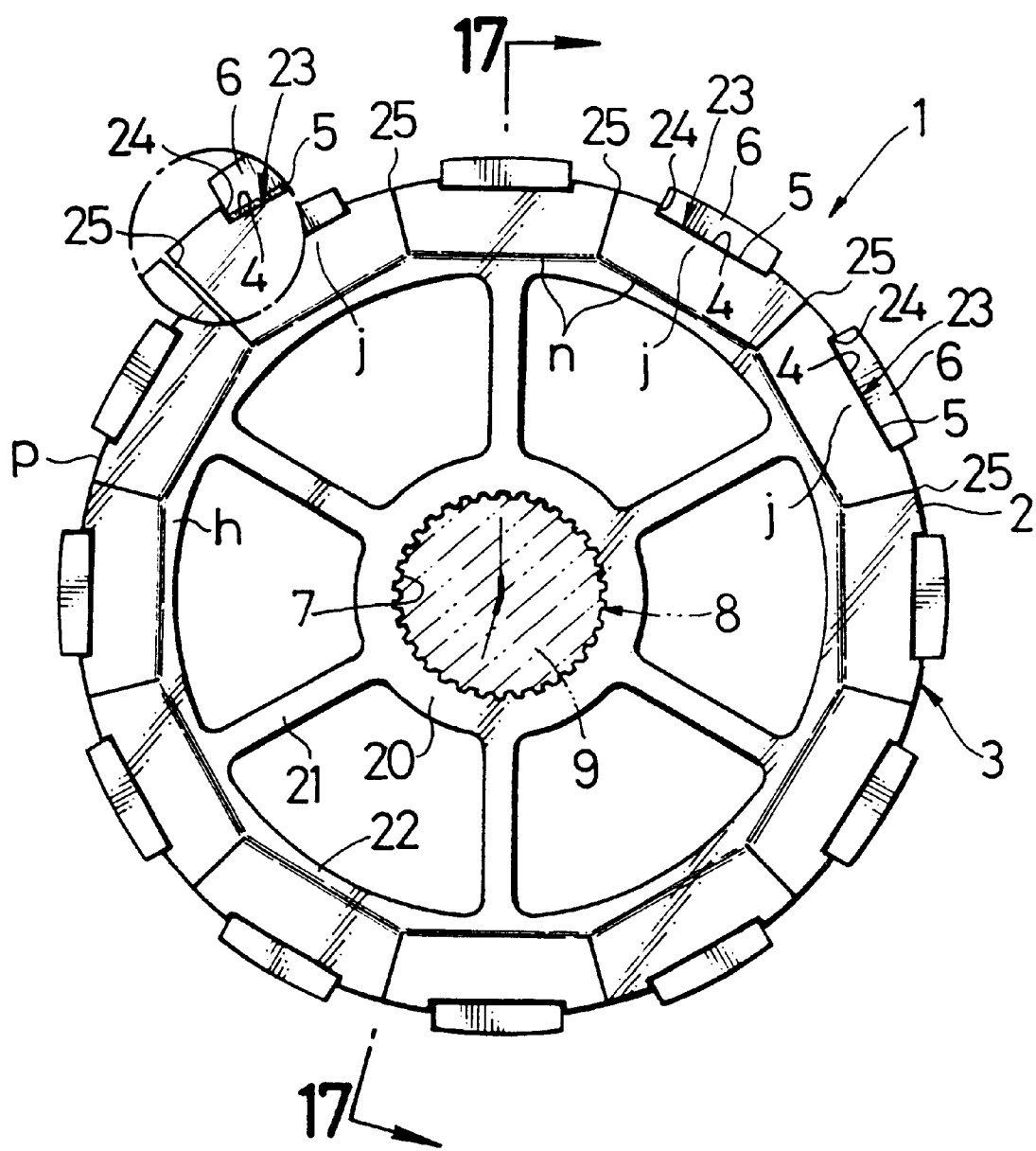
FIG. 16 is an enlarged view of an essential portion, taken along a line 16—16 in FIG. 15.

Referring to FIGS. 15 and 16, a rotor 1 for a motor is comprised of a cylindrical rotor body 3 which is a laminate formed by laminating a plurality of circular steel plates 2, and a plurality of permanent magnets 6 bonded to an outer peripheral surface of the rotor body 3 with a brazing filler metal layer 11 interposed therebetween. A spline shaft portion 9 of a rotor shaft 8 is press-fitted into a spline bore 7 located in the rotor body 3 at the center thereof, and edges of opposite openings of the spline bore 7 are secured to the rotor shaft 8 through weld zones (not shown), respectively. The permanent magnets 6 extend in a direction of a generatrix on the outer peripheral surface of the rotor body 3, with a gap being left between the adjacent permanent magnets 6.

The rotor body 3 is comprised of a boss portion 20 having the spline bore 7, a plurality of arm portions 21 extending radiately from an outer peripheral surface of the boss portion 20, and a rim portion 22 connected to each of the arm portions 21. A plurality of bonding grooves 23 are defined in the rim portion 22 to extend in a direction of a generatrix on an outer peripheral surface of the rim portion 22. The permanent magnets 6 are bonded to each of the rotor body 3 on bottom surfaces, i.e., joint surfaces 4 of each of the bonding grooves 23 with a brazing filler metal layer 5 interposed therebetween. In a rim forming area h of each of the steel plates 2, a slit 25 extending to a radially middle portion from an outer peripheral surface of the area h, is defined on opposite sides of each of the permanent magnet bonding portions j having a notched recess 24 defining the bonding groove 23. In this case, the single slit 25 is located between the adjacent permanent magnet bonding portions j, and each of the slits 25 in the steel plates 2 extend in a direction of a generatrix of the outer peripheral surface of the rotor body 3.

Figure 17:
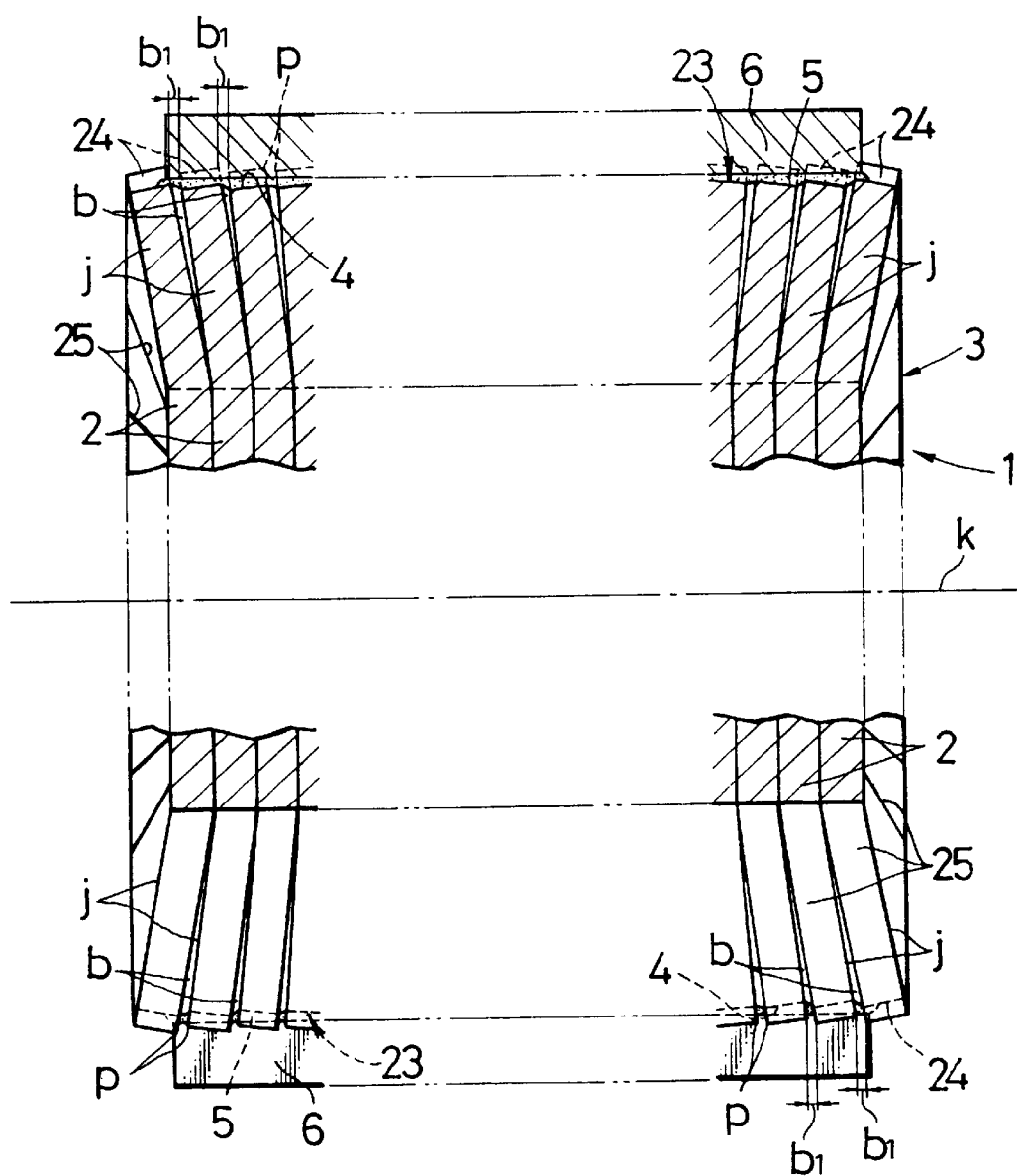
FIG. 17 is a sectional view of an essential portion, taken along a line 17—17 in FIG. 16.

As best shown in FIGS. 16 and 17, each of the permanent magnet bonding portions j in a plurality of the steel plates 2 are folded outwards of the rotor body 3 at least at opposite ends of the rotor body 3 in a direction of an axis k under the presence of the slits 25 located on opposite sides of the joint portion j, thereby leaving gaps b between the adjacent bonding portions j in the direction of the axis k.

In the rotor 1 of the above-described construction, the permanent magnets 6 are bonded to the rotor body 3 with the brazing filler metal layer 5 interposed therebetween. Therefore, even if the temperature of the rotor is risen up to a temperature reducing the bond strength of a synthetic resin adhesive, e.g., to 100° C. with operation of the motor, the bond strength of each of the permanent magnet 6 cannot be injured.

On the other hand, as the temperature of the rotor is risen or lowered, a thermal stress is concentrated to outer peripheral sides of opposite ends of the rotor body 3 in the direction of the axis k. With such construction, since the gap b is left between the adjacent permanent magnet bonding portions j in a plurality of the steel plates 2 on the outer peripheral sides of these opposite ends, the expansion and shrinkage of the permanent magnet bonding portions j are absorbed by the gaps b, thereby moderating the thermal stress on the outer peripheral sides of the opposite ends. Thus, cracks cannot be produced in each of the permanent magnets 6. Gaps b may be produced between all the adjacent permanent magnets bonding portions by the fact that each of the permanent magnet bonding portions j located on the side of one end from a position bisecting the rotor body 3 in an axial direction and each of the permanent magnet bonding joint portions j located on the other side are folded in a direction away from each other, namely, outwards of the rotor body 3 under the presence of the slits 25.

Further, when the rotor shaft 8 is press-fitted into the spline bore 7 in the boss portion 20, each of the slits 25 in each of the steel plates 2 tends to be widened to exhibit an effect of moderating the stress produced with such press-fitting.

The permanent magnet 6 which may be used is likewise a permanent magnet containing a rare earth element or elements such as an NdFeB-based permanent magnet. The brazing filler metal 11 which may be used is a highly active brazing filler metal which is similar to the above-described brazing filler metal and which is formed from a rare earth element-based alloy.

Figure 18:
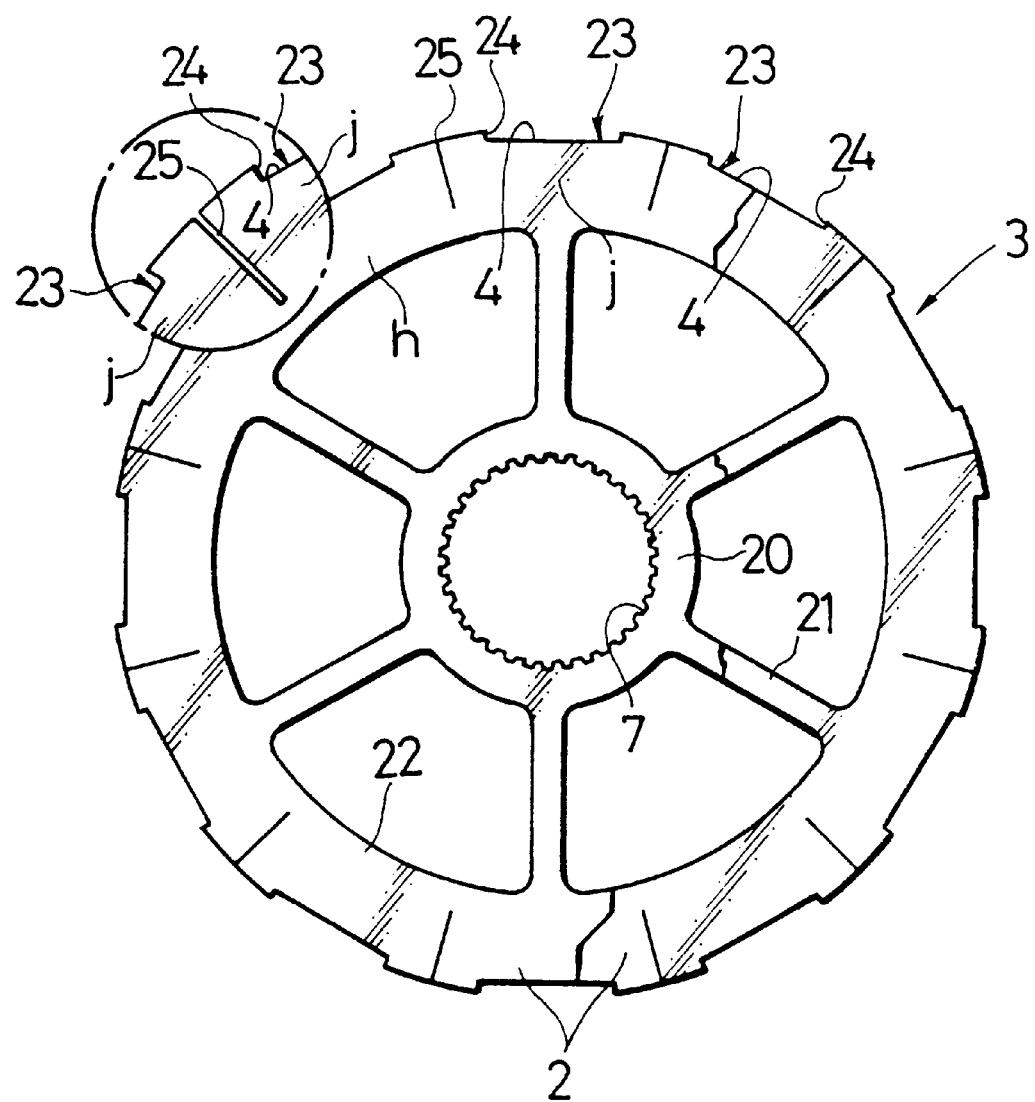
FIG. 18 is a partially enlarged and partially cutaway end view of a rotor body.

In producing the above-described rotor 1, a rotor body 3 is first prepared which is formed by laminating a plurality of steel plates 2 having slits 25 to one another on opposite sides of permanent magnet bonding portions j each having a notched recess 24, as shown in FIG. 18. The slit extends inwards from an outer peripheral surface of the steel plate 2, e.g., extends to a radially middle portion of the steel plate 2 in the illustrated embodiment.

Figure 19:
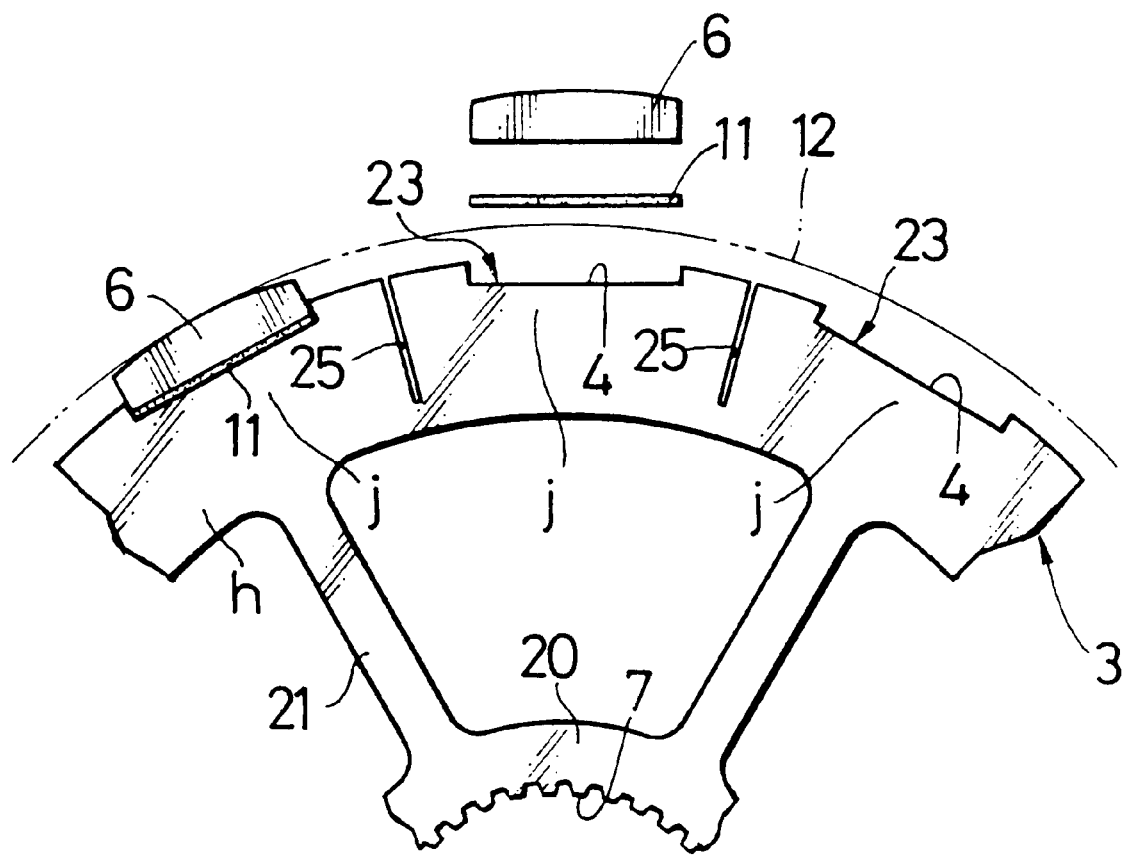
FIG. 19 is a view for explaining how a permanent magnet and a brazing filler metal are superposed onto a rotor body.

Then, as shown in FIG. 19, each of the permanent magnets 6 are superposed onto the bottom surfaces, i.e., joint surfaces of each of the bonding grooves 23 through a foil-like brazing filler metal 11, and a heat-resistant band 12 is wound around the rotor body 3 to fix each of the permanent magnets 6 and the brazing filler metal 11 to the rotor body 3 by the band 12.

Thereafter, the stack is placed into a vacuum heat treating furnace, where the brazing filler metal 11 is heated into a liquid phase state to bond the permanent magnets 6 to the rotor body 3.

Figure 20:
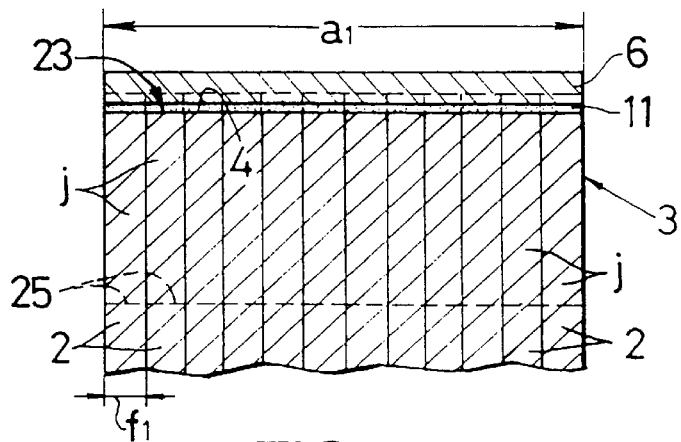
FIGS. 20 to 22 are views for explaining a heating/bonding mechanism in another embodiment, FIG. 20 being a view before heating, FIG. 21 being a view during heating, and FIG. 22 being a view after cooling.
Figure 21:
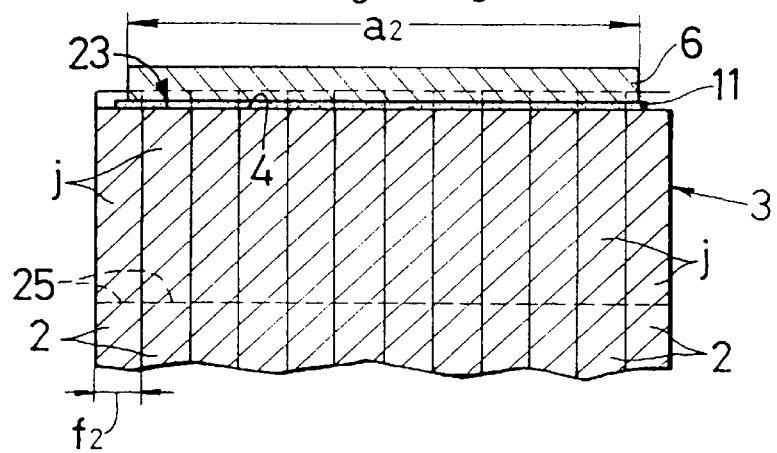
Figure 22:
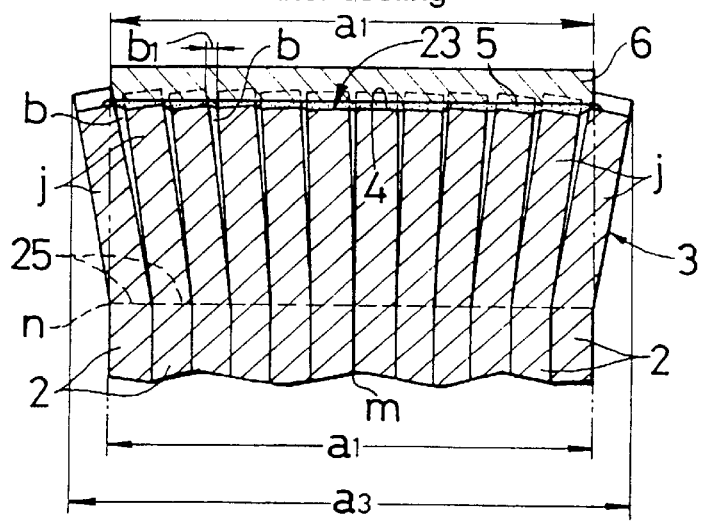

FIGS. 20 to 22 illustrate a heating/bonding mechanism. Before the heating as shown in FIG. 20, the lengths $a_1$, of the rotor body 3 and the permanent magnet 6 are equal to each other. During the heating as shown in FIG. 21, the rotor body 3 and each of the permanent magnets 6 are expanded, so that the thickness $f_2$ of each of the steel plates 2 is larger than the thickness $f_1$ before the heating ($f_2>f_1$), and the length $a_2$ of each of the permanent magnets 6 is larger then the length $a_1$, before the heating ($a_2>a_1$,). After the cooling as shown in FIG. 22, each of the steel plates 2 of the rotor body 3 having a large coefficient of linear thermal expansion during the cooling is shrunk and bonded to each of the permanent magnet 6. Therefore, each of the permanent magnet bonding portions j located on the side of one end from a position bisecting the rotor body 3 in the direction of the axis k and each of the permanent magnet bonding portions j located on the side of the other end are folded in a direction away from each other, i.e., outwards of the rotor body 3 from a folding point n provided by a phantom line connecting the terminal ends of the adjacent slits 25 under the presence of the slits 25. As a result, a gap b is produced between the adjacent permanent magnet bonding portions j in the direction of the axis j and hence, the side of the adjacent permanent magnet bonding portions j in the rotor body 3 is restrained in a state in which its length $a_3$ is larger than the length $a_1$, before the heating ($a_3>a_1$,). Thus, the thermal stress generated in the adjacent permanent magnet bonding portions j is moderated, as compared with a case where the length of the portion of the rotor body 3 on the side of the adjacent permanent magnet bonding portions j is restored substantially to the length $a_1$ before the heating, as shown by a dashed line in FIG. 22. Therefore, even if the permanent magnet 6 is brittle, cracks cannot be produced in each of the permanent magnets 6.

It is desirable that the heating time e at the bonding step is equal to or shorter than 10 hours (e≦10 hour) for the same reason as that described above. From the viewpoint of enhancing the productivity, e≦1 hour.

A particular example will be described below.

A rotor body 3 was prepared which had 12 notched recesses 24 and 12 slits 25 each having a size of 0.3 mm wide and 10 mm long and which was formed by laminating a plurality of circular cold-rolled steel plates 2 having a thickness of 0.4 mm as shown in FIG. 18. The rotor body 3 has an outside diameter of 136 mm and a length of 100 mm and includes 12 bonding grooves 23 each having a size of 20 mm wide, 1 mm deep and 100 mm long.

A foil-like brazing filler metal 11 was prepared which was formed from an $Nd_{70}Cu_{25}Al_5$ alloy and had a volume fraction Vf of an amorphous phase equal to 100% and a size of 100 mm long, 20 mm wide and 0.1 mm thick.

An NdFeB-based permanent magnet (made under a trade name of NEOMAX-28UH by Sumitomo Tokushu Kinzoku Co., and having Curie point of 350° C.) similar to that described above and having a size of 100 mm long, 20 mm wide and 6 mm thick was selected.

The foil-like brazing filler metal (having a thickness of 0.2 mm) 11 and the permanent magnet 6 superposed on each other were fitted into each of the bonding grooves 23 in the rotor body 3 in the named order and superposed onto the joint surface 4, as shown in FIG. 19. Then, a heat-resistant band 12 was wound around the rotor body 3 to fix each of the permanent magnets 6 and the brazing filler metal 11 to the rotor body 3 by the band 12. Thereafter, the stack was placed into a vacuum heat treating furnace and subjected to a heating step at a heating temperature T of 530° C. for a heating time h of 30 minutes and then to a bonding treatment using a furnace cooling to produce a rotor 1 having each of the permanent magnets 6 bonded to the rotor body 3 through the brazing filler metal layers 5 interposed therebetween, as shown in FIGS. 15 to 17.

In this rotor 1, gaps b exist between all the adjacent permanent magnet bonding portions j, as best shown in FIG. 17. An average length $b_1$, between outer peripheral edges p of the permanent magnet bonding portions j in the gap b was of 0.04 mm. No crack was produced in each of the permanent magnets 6.

Further, to examine the heat resistance of the rotor 1, the rotor 1 was placed into a heat treating furnace, where it was heated for one hour at 150° C. and then cooled at room temperature. The result showed that no crack was produced in each of the permanent magnets 6.

Third Embodiment

Figure 23:
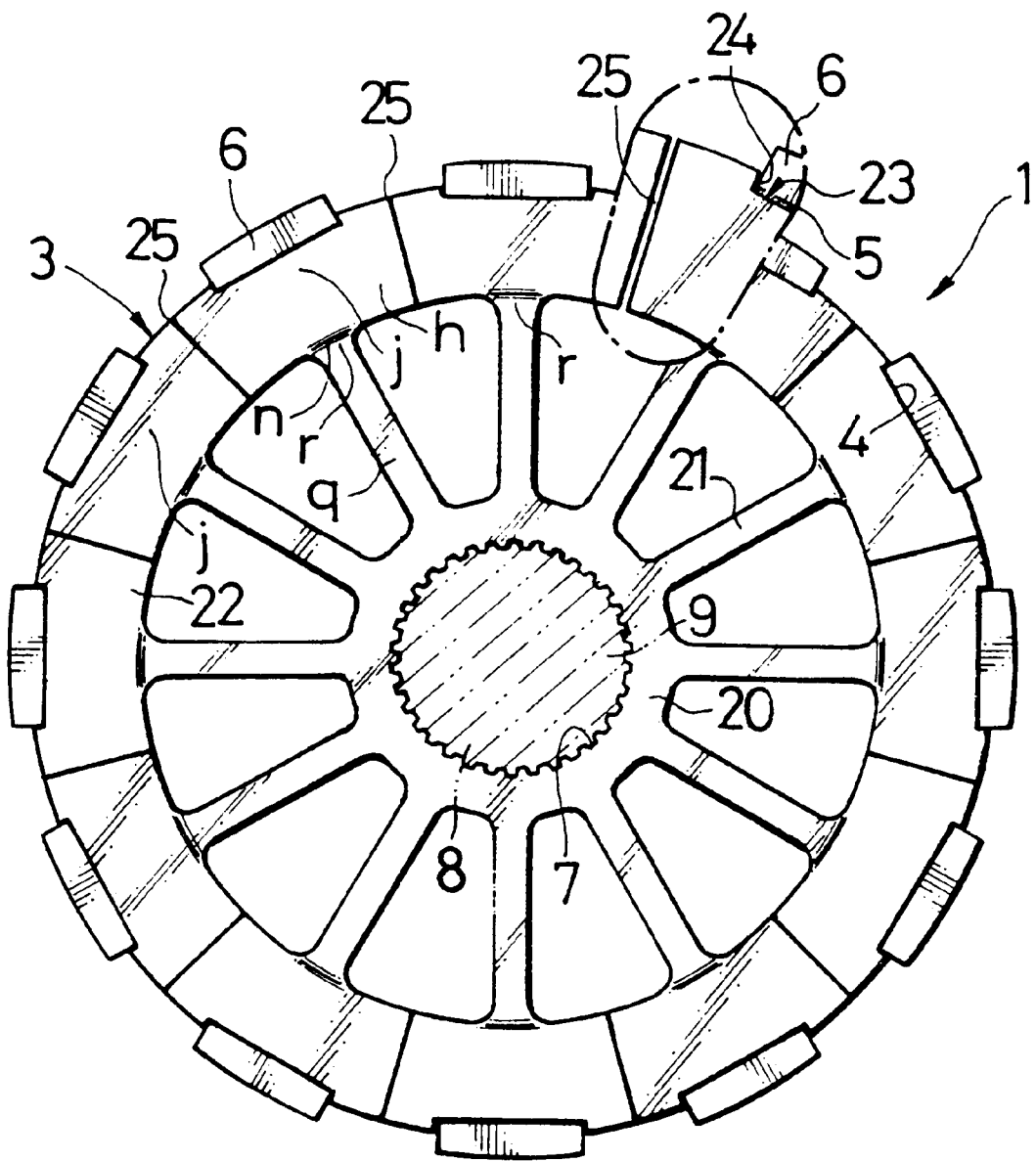
FIG. 23 is a sectional view similar to FIG. 16 but illustrating a third embodiment of a rotor for a motor.

FIG. 23 illustrates another example of a rotor 1. A rotor body 3 of the rotor 1 is comprised of a boss portion 20, a plurality of arm portions 21 extending radiately from an outer peripheral surface of the boss portion 20, and a rim portion 22 connected to each of the arm portions 21. Adjacent slits 25 extend in a rim portion forming area h from an outer peripheral surface to an inner peripheral surface thereof, so that they sandwich a connecting portion r between the rim portion forming area h and an arm portion forming area g of the steel plate 2. In this case, each of the permanent magnet bonding portion j in each of the steel plates 2 is folded from a folding point n in each of the narrow connecting portion r and hence, folded more easily, as compared with that shown in FIG. 18. Therefore, a gap b is easily formed.

Fourth Embodiment

Figure 24:
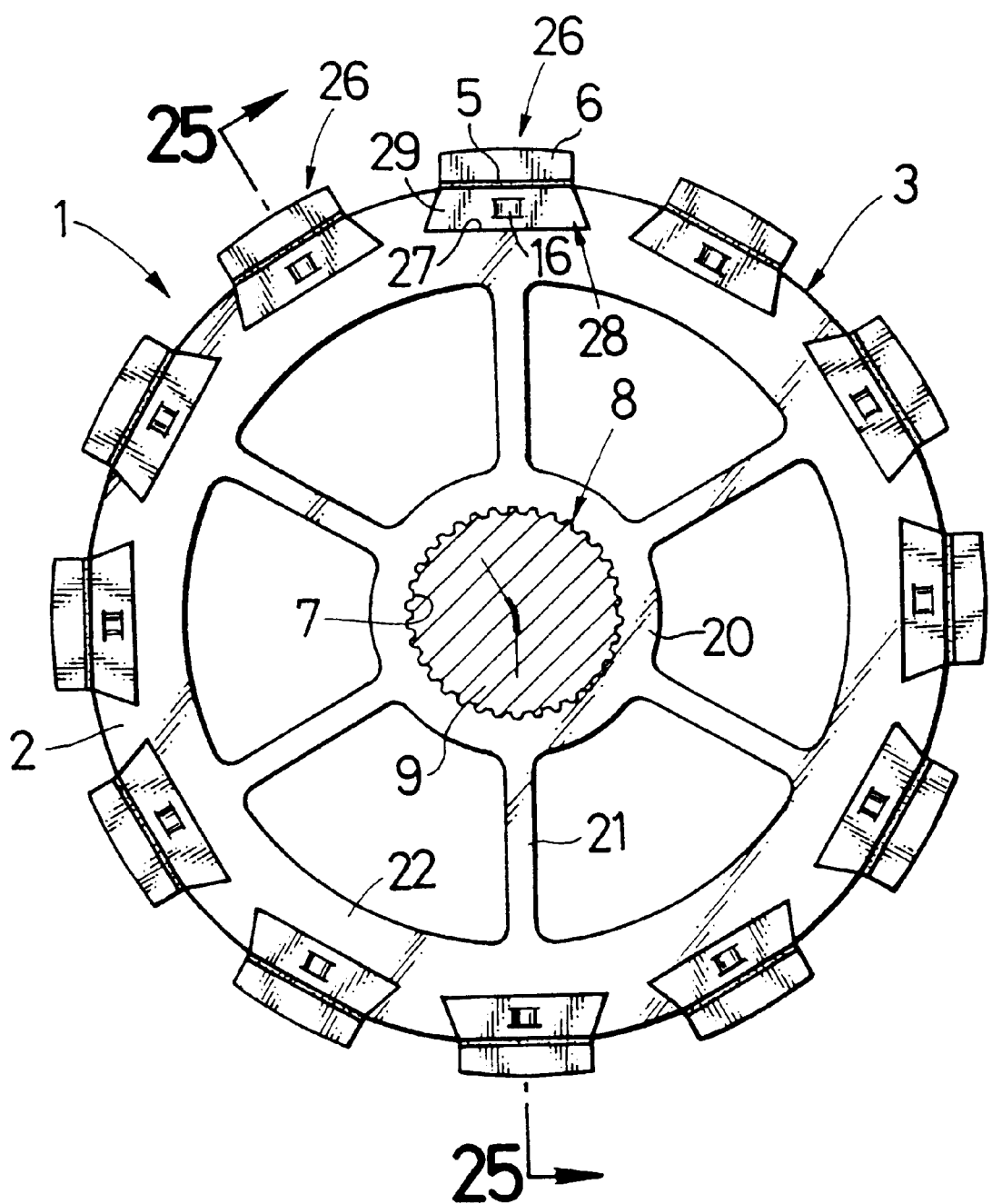
FIG. 24 is a sectional view illustrating a fourth embodiment of a rotor for a motor, taken along a line 24—24 in FIG. 25.
Figure 25:
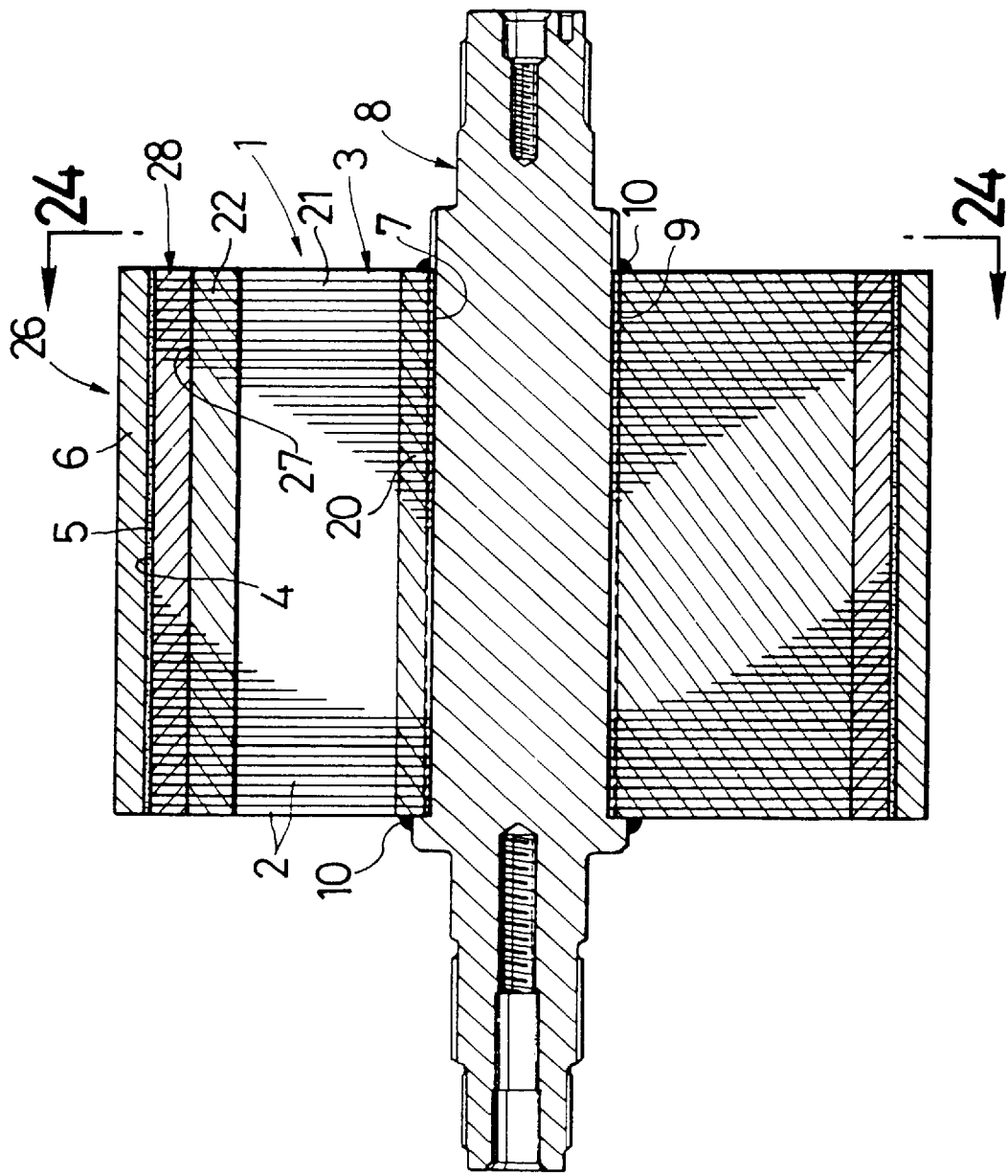
FIG. 25 is a sectional view taken along a line 25—25 in FIG. 24.

Referring to FIGS. 24 and 25, a rotor 1 for a motor includes a cylindrical rotor body 3 formed by laminating a plurality of circular steel plates 2, and a plurality of magnet units 26 mounted to an outer periphery of the rotor body 3. A spline shaft portion 9 of a rotor shaft 8 is press-fitted into a spline bore 7 located at the center of the rotor body 3, and edges of opposite openings of the spline bore 7 are secured to the rotor shaft 8 respectively through weld zones 10.

The rotor body 3 is comprised of a boss portion 20 having the spline bore 7, a plurality of arm portions 21 extending radiately from an outer peripheral surface of the boss portion 20, and a rim portion 22 connected to each of the arm portions 21. A plurality of dovetail grooves 27 are defined in the rim portion 22 to extend in a direction of a generatrix of an outer peripheral surface of the rim portion 22.

Figure 26:
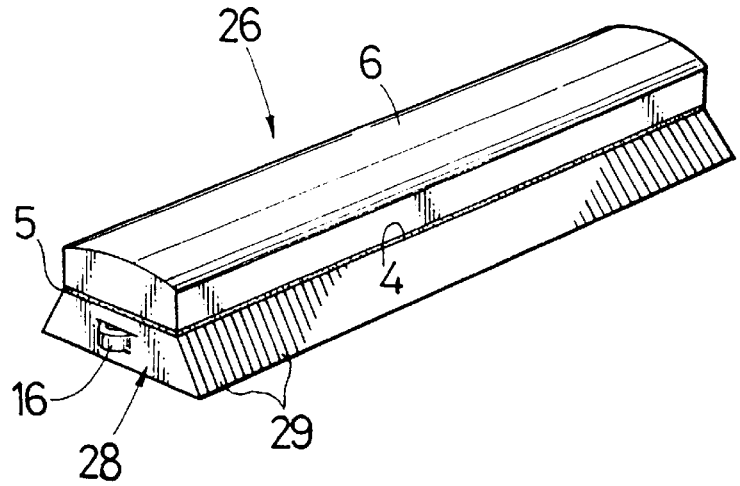
FIG. 26 is a perspective view of a magnet unit.

As shown in FIG. 26, each of the magnet units 26 is comprised of a pedestal 28 which is dovetail-shaped in section, the permanent magnet 6 bonded to a joint surface 4 of the pedestal 28 on a shorter parallel side through a brazing filler metal layer 5 under heating.

Each of the magnet units 26 is mounted to the rotor body 3 with the pedestal 28 fitted in the dovetail groove 27 in the rotor body 3.

In the rotor 1, the bonding method using the brazing filler metal is employed for bonding each of the permanent magnets 6, Therefore, the bond strength of each permanent magnet 6 is high, and even if the temperature of the rotor is risen to a level reducing the bond strength of a synthetic resin adhesive, e.g., 100° C. with as operation of a motor, the bind strength of each permanent magnet 6 cannot be injured.

Moreover, the mounting of each of the magnet units 26 to the rotor body 3 can be carried out after confirmation of the state of permanent magnet 6 bonded to the pedestal 28 in each of the magnet units 26, and hence, a high reliability is obtained for the bonded structure of each permanent magnet 6 in the rotor 1.

As best shown in FIG. 26, the pedestal 28 is formed by laminating a plurality of dovetail-shaped steel plates 29, and a caulking means 16 is employed for bonding of each of the steel plates 29.

Figure 27:
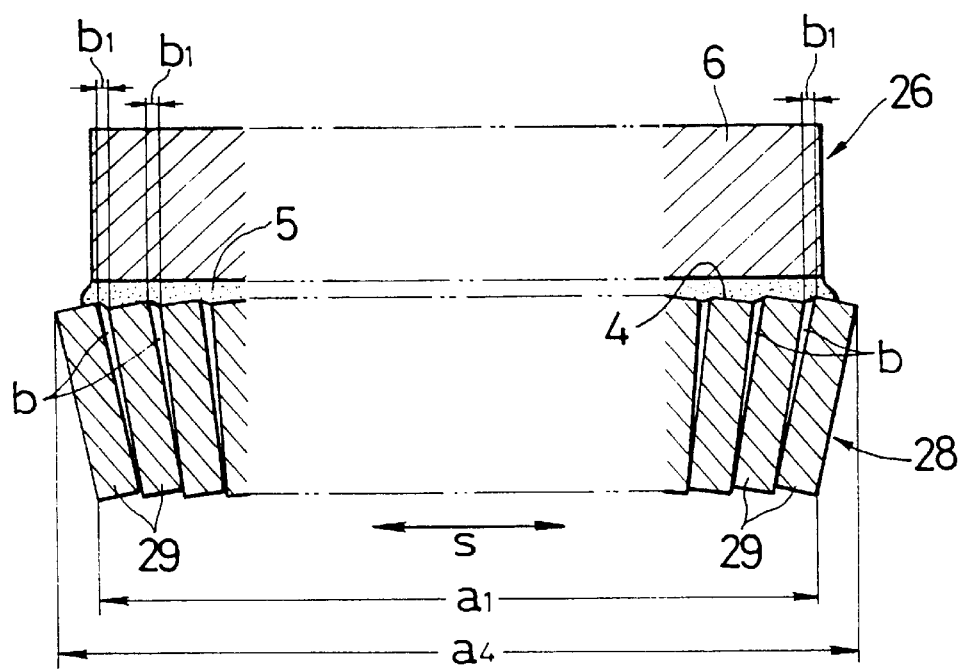
FIG. 27 is a sectional view of an essential portion for illustrating the structure of the magnet unit.

As shown in FIG. 27, gaps b produced by the heating are provided between the adjacent steel plates 29 at least on the side of opposite ends of the pedestal 28 in a direction s of lamination of the steel plates, e.g., over the substantial entire length of the pedestal 28 in the direction s.

In the rotor 1, a thermal stress is concentrated to the opposite ends of the pedestal 28 in the direction j of lamination of the steel plates with rising and lowering of the temperature of the rotor. With such construction, the gaps b are provided between the adjacent steel plates 29 at the opposite ends of the pedestal 28 and therefore, the expansion and shrinkage of the steel plates 29 can be absorbed by the gaps b, thereby moderating the thermal stress at the opposite ends to avoid the generation of cracks in each of the permanent magnets 6.

Figure 28:
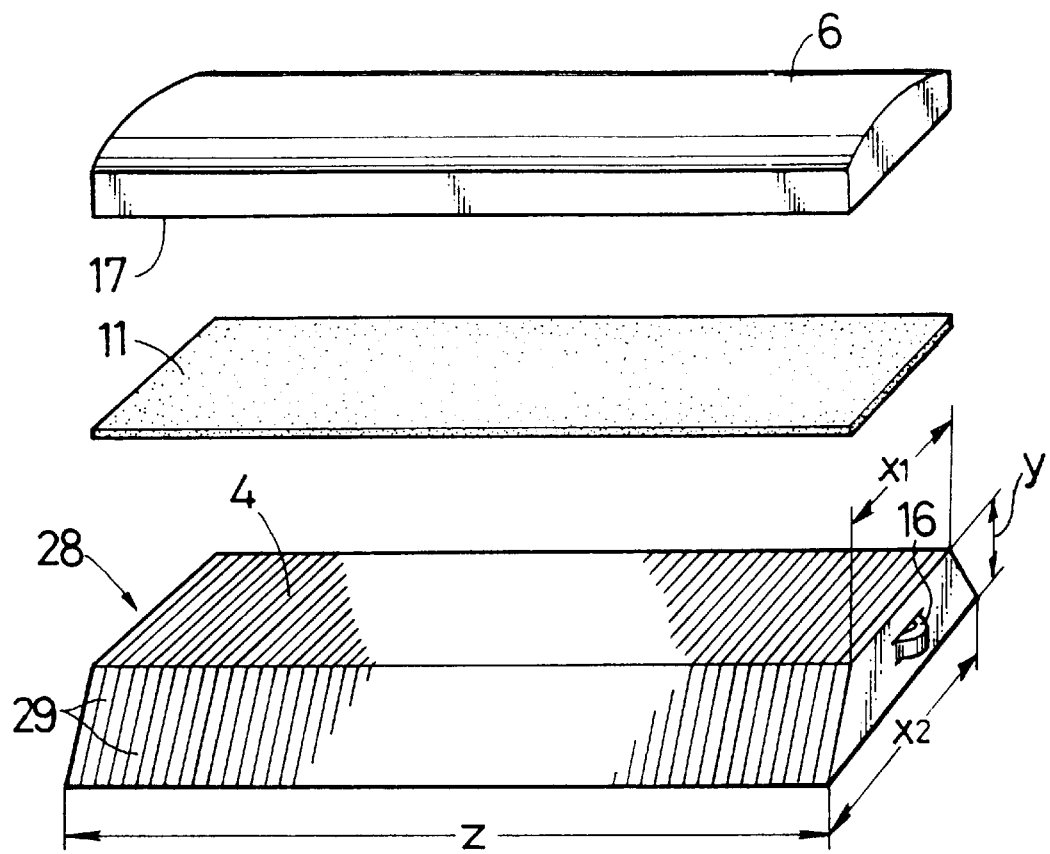
FIG. 28 is a perspective view illustrating how a permanent magnet and a brazing filler metal are superposed to a pedestal.
Figure 29:
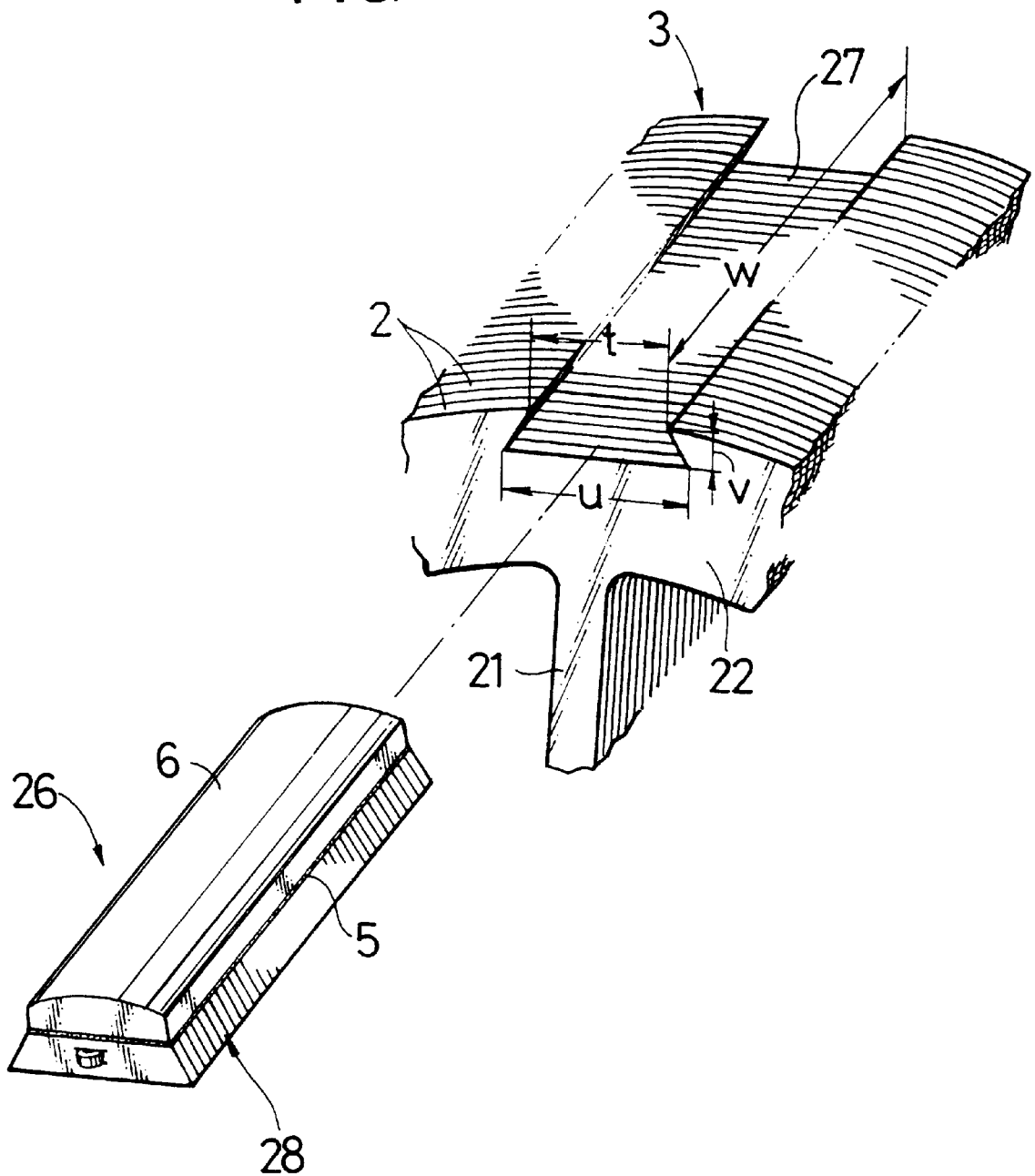
FIG. 29 is a perspective view illustrating how a magnet unit is mounted to a rotor body.

In producing the rotor 1, the following steps are employed: a step of bonding the joint surface 17 of the permanent magnet 6 and the joint surface 4 of the pedestal 28 on the shorter parallel side to each other with a thin plate and foil-like brazing filler metal 11 interposed therebetween to provide a plurality of stacks, as shown in FIG. 28; a step of placing the stacks into a vacuum heat treating furnace to heat the stacks, so that the brazing filler metal 11 is brought into, for example, a liquid phase state or a solid-liquid coexisting state, thereby providing a plurality of magnet units 26 each having the permanent magnet 6 and the pedestal 28 bonded to each other through the brazing filler metal layer 5; and a step of fitting the pedestals 28 of each of the magnet units 26 into each of dovetail grooves 27 provided in the outer periphery of the rotor body 3 to mount each of the magnet units 26 to the rotor body 3, as shown in FIG. 29.

In producing each of the magnet units 26 in such producing process, the rising of the temperature to a level required for the bonding and the cooling after bonding by the heating can be performed in a relatively short time, thereby shortening the time required for the bonding treatment, because each of the pedestal 28 has a relatively small heat capacity.

In addition, since each of the magnet units 26 is mounted to the rotor body 3 through the pedestal 28, the degree of freedom of the mounting means is high and thus, in addition to the fitting in such a manner of dovetail (pedestal 28)-dovetail groove 27, any of other means such as a welding, a screwing and a caulking can be employed. Therefore, each of the magnet units 26 is easily mounted to the rotor body 3 through the pedestal 28.

Thus, the productivity of the rotor 1 is enhanced. When the dovetail-dovetail fitting manner is employed, each of the pedestals 28 and the rotor body 3 may be welded to each other if required.

Further, since the measure of heating the stack comprised of the permanent magnet 6, the brazing filler metal 11 and the pedestal 28 is employed in producing each of the magnet units 26, the heating state of each stack can be uniformized to suppress the generation of a bonding failure to the utmost, thereby increasing the yield of the magnet units 26 and in its turn, the rotor 1.

The heating/bonding mechanism in the magnet unit 26 is the same as in the first embodiment shown in FIGS. 4 to 6. Thus, the thermal stress generated in the brazing filler metal layer 5 is moderated and hence, even of the permanent magnet 6 is brittle, a disadvantage of cracks generated in the permanent magnet 6 can be avoided.

Examples of the permanent magnet 6 which may be used are those containing a rare earth element or elements such as NdFeB-based permanent magnet, as in the above-described embodiment. Examples of the brazing filler metal 11 which may be used are highly-active filler metal which are similar to those described above and which are formed from a rare earth element-based alloy.

It is desirable that the heating time e at the step of bonding the magnet unit 26 is equal to or shorter than 10 hours ($e \leq 10$ hours) for the same reason as that described above. From the viewpoint of enhancing the productivity, $e \leq 1$ hour.

A particular example of production of the rotor 1 will be described below.

A rotor body 3 was prepared which was formed by laminating a plurality of circular cold-rolled steel plates 2 having a thickness of 0.4 mm. The rotor body 3 had an outside diameter of 136 mm and a length of 100 mm, and included a rotor shaft 8. The rotor body 3 had 12 dovetail grooves 27 each having an opening width t of 22 mm, a bottom surface width u of 30 mm, a depth of 5 mm and a length w in a direction of a generatrix equal to 100 mm, as shown in FIGS. 24 and 29.

A pedestal 28 was prepared which was formed by laminating dovetail-shaped cold-rolled steel plates 29 having a thickness of 0.4 mm and which had a shorter parallel side length $x_1$ of 21.8 mm, a longer parallel side length $x_2$ of 29.8 mm, a height y og 4.9 mm and a length z of 100 mm, as shown in FIG. 28.

A foil-like brazing filler metal 11 was prepared which was formed from an $Nd_{70}Cu_{25}Al_5$ alloy and had a size of 100 mm long, 22 mm wide and 0.1 mm thick.

An NdFeB-based permanent magnet 6 (made under a trade name of NEOMAX-28UH by Sumitomo Tokushu Kinzoku Co., and having Curie point of 350° C.) similar to that described above and having a size of 100 mm long, 22 mm wide and 6 mm thick was selected.

The foil-like brazing filler metal 11 was superposed onto an upward-turned joint surface 4 of the pedestal 28, and the permanent magnet 6 was superposed with its joint surface 17 turned downwards onto the brazing filler metal 11, thereby fabricating a stack, as shown in FIG. 28. In a similar procedure, a total of 12 stacks were fabricated. Then, all of the stacks were placed into a vacuum heat treating furnace and subjected to a heating step at a heating temperature d of 530° C. for a heating time e of 15 minutes and then a bonding treatment using a furnace cooling to provide 12 magnet units 26 each including the permanent magnet 6 bonded to the pedestal 28 through the brazing filler metal layer 5, as shown in FIG. 26. In this bonding treatment, the brazing filler metal 11 is brought into a liquid phase state, because the heating temperature d is 530° C. and exceeds the above-described liquid phase producing temperature of the brazing filler metal 11 of 474° C.

In these magnet units 26, gaps b existed between all the adjacent steel plates 29, and an average length $b_1$ between edges of tip ends of the adjacent steel plates 29 in the gaps b was about 4 μm. In each of the magnet units 26, no crack was produced in the permanent magnets 6.

The pedestal 28 of each of the magnet units 26 was fitted into each of dovetail grooves 27 in the rotor body 3 to produce a rotor 1, as shown in FIG. 29.

To examine the heat resistance of the rotor 1, the rotor 1 was placed into a heat treating furnace, where it was heated at 150° C. for 1 hour and then cooled at room temperature. The result showed that no crack was produced in each of the permanent magnets 6.

In the rotor 1, even if it was rotated at a high speed of 10,000 rpm or more, no permanent magnets were dropped from the rotor body 3.

Further, to examine the yield of the rotor 1, 1,200 magnet units 26 were produced to correspond to 100 rotors 1. The result showed that a bonding failure was produced in each of three magnet units 26.

From this, it was made clear that the yield R of the magnet unit 26 was {(1,200−3)/1,200}×100≈99.8% and hence, it was made clear that the yield of the rotor 1 could be largely increased.

In this fourth embodiment, the rotor body 3 may be a cast product or a mechanically processed article formed from a block made of a steel.

What is claimed is:

1. A rotor for a rotating machine, comprising a cylindrical rotor body formed by laminating a plurality of steel plates, and a plurality of permanent magnets each bonded to an outer peripheral surface of the rotor body through a brazing filler metal layer, said permanent magnets each extending in a direction of a generatrix of the outer peripheral surface of said rotor body with a spacing being provided between adjacent ones of said permanent magnets, wherein permanent magnet bonding portions in the plurality of steel plates at least on axially opposite end sides of said rotor body are bent outwards of said rotor body because of slits existing on opposite sides of each of the permanent magnet bonding portions, thereby providing gaps between axially adjacent ones of said permanent magnet bonding portions.

2. A rotor for a rotating machine according to claim 1, wherein said rotor body comprises a boss portion, a plurality of arm portions extending radiately from an outer peripheral surface of said boss portion, and a rim portion connected to said arm portions, each of said slits extending in a rim portion forming area of said steel plate from an outer peripheral surface of said area to a radially middle portion of said area.

3. A rotor for a rotating machine according to claim 1, wherein said rotor body comprises a boss portion, a plurality of arm portions extending radiately from an outer peripheral surface of said boss portion, and a rim portion connected to said arm portions, adjacent ones of said slits extending in a rim portion forming area of said steel plate from an outer peripheral surface of said area to a radially middle portion of said area so as to sandwich a connecting portion between the rim portion forming area and an arm portion forming area of said steel plate.

4. A rotor for a rotating machine according to claim 1, 2 or 3, wherein said permanent magnet is a permanent magnet including a rare earth element.

5. A rotor for a rotating machine according to claim 1, 2 or 3, wherein said brazing filler metal is formed of a rare earth element-based alloy.

6. A rotor for a rotating machine according to claim 5, wherein said rare earth element-based alloy includes at least one alloy element AE which is selected from the group consisting of Cu, Al, Ga, Co, Fe, Ag, Ni, Au, Mn, Zn, Pd, Sn, Sb, Pb, Bi, Ge and In, the content of said alloy element AE being in a range of 5% by atom ≦AE ≦50% by atom.

7. A rotor for a rotating machine according to claim 6, wherein said permanent magnet is a permanent magnet including a rare earth element.

8. A rotor for a rotating machine according to claim 5, wherein said permanent magnet is a permanent magnet including a rare earth element.

9. A process for producing a rotor for a rotating machine, said rotor comprising a cylindrical rotor body formed by laminating a plurality of steel plates, and a plurality of permanent magnets each bonded to an outer peripheral surface of said rotor body through a brazing filler metal layer, said permanent magnets each extending in a direction of a generatrix of the outer peripheral surface of the rotor body with a spacing being provided between adjacent ones of said permanent magnets, said process comprising the steps of preparing a rotor body formed by laminating the plurality of steel plates each having slits extending inwards from an outer peripheral surface of said steel plate on opposite sides of each of the permanent magnet bonding portions of said rotor body; superposing each of the permanent magnets onto each of said permanent magnet bonding portions of said rotor body through said brazing filler metal layer; and bonding each of said permanent magnets to said rotor body through said brazing filler metal layer under heating in such a manner that a gap exists in said rotor body between the adjacent permanent magnets by bending of the permanent magnet bonding portions of the plurality of steel plates in an outward direction of the rotor body by the slits on the opposite sides of the permanent magnet bonding portions.

10. A process for producing a rotor for a rotating machine according to claim 9, wherein said brazing filler metal is formed of a rare earth element-based alloy.

11. A process for producing a rotor for a rotating machine according to claim 10, wherein said rare earth element-based alloy includes at least one alloy element AE which is selected from the group consisting of Cu, Al, Ga, Co, Fe, Ag, Ni, Au, Mn, Zn, Pd, Sn, Sb, Pb, Bi, Ge and In, the content of said alloy element AE being in a range of 5% by atom ≦AE ≦50% by atom.

12. A process for producing a rotor for a rotating machine according to claim 9, 10 or 11, wherein said permanent magnet is a permanent magnet including a rare earth element.

13. A rotor for a rotating machine, comprising a rotor body, and a plurality of magnet units mounted to an outer peripheral surface of said rotor body, each of said magnet units comprising a pedestal formed by laminating a plurality of steel plates and mounted to said rotor body, and a permanent magnet bonded to said pedestal through a brazing filler metal layer under heating, a gap produced by the heating and bonding being provided between the adjacent steel plates.

14. A rotor for a rotating machine according to claim 13, wherein said brazing filler metal is formed of a rare earth element-based alloy.

15. A rotor for a rotating machine according to claim 14, wherein said brazing filler metal includes at least one alloy element AE in an amount of 5% by atom $\leq$ AE $\leq$ 50% by atom, said alloy element AE being selected from the group consisting of Cu, Al, Ga, Co, Fe, Ag, Ni, Au, Mn, Zn, Pd, Sn, Sb, Pb, Bi, Ge and In.

16. A rotor for a rotating machine according to claim 13, 14 or 15, wherein said permanent magnet is a permanent magnet including a rare earth element.

17. A rotor for a rotating machine according to claim 16, wherein said pedestal is formed by laminating a plurality of steel plates.

18. A process for producing a rotor for a rotating machine, comprising a step of forming a plurality of stacks with brazing filler metal interposed between a permanent magnet and a pedestal formed by laminating a plurality of steel plates, a step of heating said stacks to provide a plurality of magnet units each including said permanent magnet and said pedestal bonded to each other through said brazing filler metal layer, so that a gap produced by the heating and bonding is provided the adjacent steel plates, and a step of mounting each of the magnet units to an outer periphery of a rotor body through said pedestal.

19. A process for producing a rotor for a rotating machine according to claim 18, wherein said brazing filler metal is formed of a rare earth element-based alloy.

20. A process for producing a rotor for a rotating machine according to claim 19, wherein said brazing filler metal includes at least one alloy element AE in an amount within a range of 5% by atom $\leq$ AE $\leq$ 50% by weight, said alloy element AE being selected from the group consisting of Cu, Al, Ga, Co, Fe, Ag, Ni, Au, Mn, Zn, Pd, Sn, Sb, Pb, Bi, Ge and In.

21. A process for producing a rotor for a rotating machine according to claim 18, 19 or 20, wherein said permanent magnet is a permanent magnet including a rare earth element.

22. A process for producing a rotor for a rotating machine according to claim 21, wherein said pedestal is formed by laminating a plurality of steel plates.

23. A magnet unit comprising a pedestal formed by laminating a plurality of steel plates, and a permanent magnet bonded to said pedestal through a brazing filler metal layer under heating, gaps being produced by the heating and bonding between adjacent ones of said steel plates at least on opposite end sides of said pedestal in a direction of lamination of said steel plates.

24. A magnet unit according to claim 23, wherein said brazing filler metal is formed of a rare earth element-based alloy.

25. A magnet unit according to claim 24, wherein said brazing filler metal includes at least one alloy element AE in an amount of 5% by atom $\leq$ AE $\leq$ 50% by weight, said alloy element AE being selected from the group consisting of Cu, Al, Ga, Co, Fe, Ag, Ni, Au, Mn, Zn, Pd, Sn, Sb, Pb, Bi, Ge and In.

26. A magnet unit according to claim 23, 24 or 25, wherein said permanent magnet is a permanent magnet including a rare earth element.

* * * * *